United States Patent
Duffy et al.

(10) Patent No.: US 12,297,145 B2
(45) Date of Patent: *May 13, 2025

(54) GLASSES HAVING NON-FRANGIBLE STRESS PROFILES

(71) Applicant: Corning Incorporated, Corning, NY (US)

(72) Inventors: Delena Lucinda Justice Duffy, Lindley, NY (US); Rostislav Vatchev Roussev, Painted Post, NY (US); Vitor Marino Schneider, Painted Post, NY (US); Kristy Lynn Smith, Bath, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,368

(22) Filed: Jan. 11, 2024

(65) Prior Publication Data

US 2024/0158285 A1     May 16, 2024

Related U.S. Application Data

(62) Division of application No. 17/487,302, filed on Sep. 28, 2021, now Pat. No. 11,878,941, which is a
(Continued)

(51) Int. Cl.
*C03C 3/097* (2006.01)
*C03C 3/083* (2006.01)
(Continued)

(52) U.S. Cl.
CPC .............. *C03C 3/097* (2013.01); *C03C 3/083* (2013.01); *C03C 3/085* (2013.01); *C03C 3/087* (2013.01);
(Continued)

(58) Field of Classification Search
CPC ......... C03C 3/097; C03C 3/083; C03C 3/085; C03C 3/087; C03C 3/091; C03C 3/093;
(Continued)

(56) References Cited

U.S. PATENT DOCUMENTS

| 1,960,121 A | 5/1934 | Moulton |
| 3,107,196 A | 10/1963 | Acloque |

(Continued)

FOREIGN PATENT DOCUMENTS

| AU | 6452265 A | 10/1965 |
| AU | 2011212982 A1 | 8/2012 |

(Continued)

OTHER PUBLICATIONS

Sglavo et al. "procedure for residual stress profile determination by curvature measurements" Mechanics of Materias, 2005, 37(8) pp. 887-898.
(Continued)

*Primary Examiner* — Michael Zhang
(74) *Attorney, Agent, or Firm* — Jeffrey A. Schmidt

(57) ABSTRACT

A glass exhibiting non-frangible behavior in a region where substantially higher central tension is possible without reaching frangibility is provided. This region allows greater extension of the depth of compression in which fracture-causing flaws are arrested, without rendering the glass frangible despite the presence of high central tension region in the sample.

20 Claims, 11 Drawing Sheets

Related U.S. Application Data division of application No. 14/737,701, filed on Jun. 12, 2015, now abandoned.

(60) Provisional application No. 62/014,372, filed on Jun. 19, 2014.

(51) Int. Cl.

| | | |
|---|---|---|
| C03C 3/085 | (2006.01) | |
| C03C 3/087 | (2006.01) | |
| C03C 3/091 | (2006.01) | |
| C03C 3/093 | (2006.01) | |
| C03C 3/095 | (2006.01) | |
| C03C 4/18 | (2006.01) | |
| C03C 21/00 | (2006.01) | |

(52) U.S. Cl.
CPC .............. *C03C 3/091* (2013.01); *C03C 3/093* (2013.01); *C03C 3/095* (2013.01); *C03C 4/18* (2013.01); *C03C 21/002* (2013.01); *C03C 2204/00* (2013.01)

(58) Field of Classification Search
CPC ......... C03C 3/095; C03C 4/18; C03C 21/002; C03C 2204/00
See application file for complete search history.

(56) References Cited

U.S. PATENT DOCUMENTS

| | | | |
|---|---|---|---|
| 3,287,200 A | 11/1966 | Hess et al. | |
| 3,357,876 A | 12/1967 | Dale | |
| 3,380,818 A | 4/1968 | Smith | |
| 3,404,015 A | 10/1968 | Dumbaugh, Jr. | |
| 3,410,673 A | 11/1968 | Marusak | |
| 3,433,611 A | 3/1969 | Saunders et al. | |
| 3,464,880 A | 9/1969 | Rinehart | |
| 3,489,097 A | 1/1970 | William | |
| 3,490,984 A | 1/1970 | Petticrew et al. | |
| 3,597,305 A | 8/1971 | Giffen | |
| 3,625,718 A | 12/1971 | Petticrew | |
| 3,639,198 A | 2/1972 | Plumat et al. | |
| 3,656,923 A | 4/1972 | Garfinkel et al. | |
| 3,660,060 A | 5/1972 | Spanoudis | |
| 3,673,049 A | 6/1972 | Giffen et al. | |
| 3,737,294 A | 6/1973 | Dumbaugh et al. | |
| 3,746,526 A | 7/1973 | Giffon | |
| 3,765,855 A | 10/1973 | Larrick | |
| 3,798,013 A | 3/1974 | Hasegawa et al. | |
| 3,811,855 A | 5/1974 | Stockdale et al. | |
| 3,833,388 A | 9/1974 | Ohlberg et al. | |
| 3,844,754 A | 10/1974 | Grubb et al. | |
| 3,879,183 A | 4/1975 | Carlson | |
| 3,907,577 A | 9/1975 | Kiefer et al. | |
| 3,931,438 A | 1/1976 | Beall et al. | |
| 3,936,287 A * | 2/1976 | Beall .................. | C03C 21/00 65/30.14 |
| 3,958,052 A | 5/1976 | Galusha et al. | |
| 3,959,000 A | 5/1976 | Nakagawa et al. | |
| 4,042,405 A | 8/1977 | Krohn et al. | |
| 4,053,679 A | 10/1977 | Rinehart | |
| 4,055,703 A | 10/1977 | Rinehart | |
| 4,102,664 A | 7/1978 | Dumbaugh, Jr. | |
| 4,130,437 A | 12/1978 | Mazeau et al. | |
| 4,148,661 A | 4/1979 | Kerko et al. | |
| 4,156,755 A | 5/1979 | Rinehart | |
| 4,190,451 A | 2/1980 | Hares et al. | |
| 4,192,688 A | 3/1980 | Babcock | |
| 4,214,886 A | 7/1980 | Shay et al. | |
| 4,240,836 A | 12/1980 | Borrelli et al. | |
| 4,242,117 A | 12/1980 | Van Ass | |
| 4,358,542 A | 11/1982 | Hares et al. | |
| 4,407,966 A | 10/1983 | Kerko et al. | |
| 4,468,534 A | 8/1984 | Boddicker | |
| 4,471,024 A | 9/1984 | Pargamin et al. |
| 4,483,700 A | 11/1984 | Forker et al. |
| 4,537,612 A | 8/1985 | Borrelli et al. |
| 4,608,349 A | 8/1986 | Kerko et al. |
| 4,702,042 A | 10/1987 | Herrington et al. |
| 4,726,981 A | 2/1988 | Pierson et al. |
| 4,736,981 A | 4/1988 | Barton et al. |
| 4,757,162 A | 7/1988 | Dumora et al. |
| 4,857,485 A | 8/1989 | Brennan et al. |
| 5,270,269 A | 12/1993 | Hares et al. |
| 5,273,827 A | 12/1993 | Francis |
| 5,322,819 A | 6/1994 | Araujo et al. |
| 5,342,426 A | 8/1994 | Dumbaugh, Jr. |
| 5,350,607 A | 9/1994 | Tyson et al. |
| 5,559,060 A | 9/1996 | Dumbaugh et al. |
| 5,763,343 A | 6/1998 | Brix et al. |
| 5,773,148 A | 6/1998 | Charrue et al. |
| 5,804,317 A | 9/1998 | Charrue |
| 5,895,768 A | 4/1999 | Speit |
| 5,972,460 A | 10/1999 | Tachiwana |
| 6,111,821 A | 8/2000 | Bach |
| 6,187,441 B1 | 2/2001 | Takeuchi et al. |
| 6,333,286 B1 | 12/2001 | Kurachi et al. |
| 6,376,402 B1 | 4/2002 | Pannhorst et al. |
| 6,413,892 B1 | 7/2002 | Koyama et al. |
| 6,440,531 B1 | 8/2002 | Kurachi et al. |
| 6,472,068 B1 | 10/2002 | Glass et al. |
| 6,514,149 B2 | 2/2003 | Yoon |
| 6,516,634 B1 | 2/2003 | Green et al. |
| 6,518,211 B1 | 2/2003 | Bradshaw et al. |
| 6,528,440 B1 | 3/2003 | Vilato et al. |
| 6,537,938 B1 | 3/2003 | Miyazaki |
| 6,607,999 B2 | 8/2003 | Hachitani |
| 6,689,704 B2 | 2/2004 | Ota et al. |
| 6,846,760 B2 | 1/2005 | Siebers et al. |
| 7,007,512 B2 | 3/2006 | Kamada et al. |
| 7,091,141 B2 | 8/2006 | Horsfall et al. |
| 7,176,528 B2 | 2/2007 | Couillard et al. |
| 7,476,633 B2 | 1/2009 | Comte et al. |
| 7,514,149 B2 | 4/2009 | Bocko et al. |
| 7,531,475 B2 | 5/2009 | Kishimoto et al. |
| 7,619,283 B2 | 11/2009 | Gadkaree |
| 7,666,511 B2 | 2/2010 | Ellison et al. |
| 7,687,419 B2 | 3/2010 | Kawai |
| 7,727,917 B2 | 6/2010 | Shelestak et al. |
| 7,838,136 B2 | 11/2010 | Nakashima et al. |
| 7,891,212 B2 | 2/2011 | Isono |
| 8,007,913 B2 | 8/2011 | Coppola et al. |
| 8,075,999 B2 | 12/2011 | Barefoot et al. |
| 8,099,982 B2 | 1/2012 | Takagi et al. |
| 8,143,179 B2 | 3/2012 | Aitken et al. |
| 8,158,543 B2 | 4/2012 | Dejneka et al. |
| 8,193,128 B2 | 6/2012 | Hellmann et al. |
| 8,232,218 B2 | 7/2012 | Dejneka et al. |
| 8,252,708 B2 | 8/2012 | Morena et al. |
| 8,312,739 B2 | 11/2012 | Lee et al. |
| 8,312,789 B2 | 11/2012 | Beck |
| 8,327,666 B2 | 12/2012 | Harvey et al. |
| 8,347,651 B2 | 1/2013 | Abramov et al. |
| 8,349,455 B2 | 1/2013 | Kondo et al. |
| 8,415,013 B2 | 4/2013 | Barefoot et al. |
| 8,431,502 B2 | 4/2013 | Dejneka et al. |
| 8,561,429 B2 | 10/2013 | Allan et al. |
| 8,580,411 B2 | 11/2013 | Endo et al. |
| 8,586,492 B2 | 11/2013 | Barefoot et al. |
| 8,623,776 B2 | 1/2014 | Dejneka et al. |
| 8,652,978 B2 | 2/2014 | Dejneka et al. |
| 8,656,734 B2 | 2/2014 | Zou et al. |
| 8,691,711 B2 | 4/2014 | Nakashima et al. |
| 8,697,592 B2 | 4/2014 | Ikenishi et al. |
| 8,713,972 B2 | 5/2014 | Lakota et al. |
| 8,756,262 B2 | 6/2014 | Zhang |
| 8,759,238 B2 | 6/2014 | Chapman et al. |
| 8,765,262 B2 | 7/2014 | Gross |
| 8,778,820 B2 | 7/2014 | Gomez et al. |
| 8,783,063 B2 | 7/2014 | Osakabe et al. |
| 8,802,581 B2 | 8/2014 | Dejneka et al. |
| 8,854,623 B2 | 10/2014 | Fontaine et al. |
| 8,932,510 B2 | 1/2015 | Li et al. |

(56) References Cited

U.S. PATENT DOCUMENTS

| | | |
|---|---|---|
| 8,943,855 B2 | 2/2015 | Gomez et al. |
| 8,946,103 B2 | 2/2015 | Dejneka et al. |
| 8,950,215 B2 | 2/2015 | Rappoport et al. |
| 8,951,927 B2 | 2/2015 | Dejneka et al. |
| 8,957,374 B2 | 2/2015 | Liu et al. |
| 8,969,226 B2 | 3/2015 | Dejneka et al. |
| 8,975,374 B2 | 3/2015 | Kimura |
| 9,003,835 B2 | 4/2015 | Lock |
| 9,007,878 B2 | 4/2015 | Matsumoto et al. |
| 9,139,469 B2 | 9/2015 | Comte et al. |
| 9,140,543 B1 | 9/2015 | Allan et al. |
| 9,145,329 B2 | 9/2015 | Drake et al. |
| 9,156,724 B2 | 10/2015 | Gross |
| 9,193,625 B2 | 11/2015 | Bookbinder et al. |
| 9,212,288 B2 | 12/2015 | Fujiwara et al. |
| 9,272,945 B2 | 3/2016 | Smith |
| 9,290,407 B2 | 3/2016 | Barefoot et al. |
| 9,290,413 B2 | 3/2016 | Dejneka et al. |
| 9,339,993 B2 | 5/2016 | Cites et al. |
| 9,346,703 B2 | 5/2016 | Bookbinder et al. |
| 9,359,251 B2 | 6/2016 | Bookbinder et al. |
| 9,487,434 B2 | 11/2016 | Amin et al. |
| 9,498,822 B2 | 11/2016 | Brandt et al. |
| 9,499,431 B2 | 11/2016 | Barefoot et al. |
| 9,567,254 B2 | 2/2017 | Amin et al. |
| 9,593,042 B2 | 3/2017 | Hu et al. |
| 9,604,876 B2 | 3/2017 | Gy et al. |
| 9,676,663 B2 | 6/2017 | Amin et al. |
| 9,701,569 B2 | 7/2017 | Demartino et al. |
| 9,751,802 B2 | 9/2017 | Allan et al. |
| 9,840,435 B2 | 12/2017 | Ohara et al. |
| 9,902,648 B2 | 2/2018 | Amin et al. |
| 9,908,810 B2 | 3/2018 | Amin et al. |
| 9,908,811 B2 | 3/2018 | Gross et al. |
| 9,977,470 B2 | 5/2018 | Demartino et al. |
| 10,017,417 B2 | 7/2018 | Dejneka et al. |
| 10,118,858 B2 | 11/2018 | Amin et al. |
| 10,144,670 B2 | 12/2018 | Akatsuka et al. |
| 10,150,698 B2 | 12/2018 | Amin et al. |
| 10,160,688 B2 | 12/2018 | Amin et al. |
| 10,239,784 B2 | 3/2019 | Oram et al. |
| 10,259,746 B2 | 4/2019 | Hu et al. |
| 10,271,442 B2 | 4/2019 | Gross et al. |
| 10,570,059 B2 | 2/2020 | Dejneka et al. |
| 10,579,106 B2 | 3/2020 | Demartino et al. |
| 10,787,387 B2 | 9/2020 | Gross et al. |
| 11,174,197 B2 | 11/2021 | Dejneka et al. |
| 11,279,652 B2 | 3/2022 | Dejneka et al. |
| 11,878,941 B2 * | 1/2024 | Duffy ................ C03C 4/18 |
| 2005/0099618 A1 | 5/2005 | Difoggio et al. |
| 2005/0143247 A1 | 6/2005 | Siebers et al. |
| 2005/0221044 A1 | 10/2005 | Gaume et al. |
| 2005/0250639 A1 | 11/2005 | Siebers et al. |
| 2006/0127679 A1 | 6/2006 | Gulati et al. |
| 2006/0279217 A1 | 12/2006 | Peuchert et al. |
| 2007/0060465 A1 | 3/2007 | Varshneya et al. |
| 2007/0122580 A1 | 5/2007 | Krall et al. |
| 2007/0123410 A1 | 5/2007 | Morena et al. |
| 2007/0218262 A1 | 9/2007 | Degand et al. |
| 2008/0026927 A1 | 1/2008 | Monique Comte |
| 2008/0128953 A1 | 6/2008 | Nagai et al. |
| 2009/0197088 A1 | 8/2009 | Murata |
| 2009/0215607 A1* | 8/2009 | Dejneka ................ C03B 5/225 |
| | | 501/27 |
| 2009/0286091 A1 | 11/2009 | Danielson et al. |
| 2010/0003508 A1 | 1/2010 | Arrouy et al. |
| 2010/0029460 A1 | 2/2010 | Shojiya et al. |
| 2010/0035038 A1* | 2/2010 | Barefoot ................ C03C 3/085 |
| | | 428/220 |
| 2010/0035745 A1 | 2/2010 | Murata |
| 2010/0087307 A1 | 4/2010 | Murata et al. |
| 2010/0119846 A1 | 5/2010 | Sawada |
| 2010/0190038 A1 | 7/2010 | Osakabe et al. |
| 2010/0200804 A1 | 8/2010 | Woodruff et al. |
| 2010/0210422 A1 | 8/2010 | Crawford |
| 2010/0215996 A1 | 8/2010 | Wendling et al. |
| 2010/0291353 A1 | 11/2010 | Dejneka et al. |
| 2011/0014475 A1 | 1/2011 | Murata |
| 2011/0067447 A1 | 3/2011 | Zadesky et al. |
| 2011/0092353 A1 | 4/2011 | Amin et al. |
| 2011/0165393 A1 | 7/2011 | Bayne et al. |
| 2011/0201490 A1* | 8/2011 | Barefoot ................ C03B 33/091 |
| | | 501/66 |
| 2011/0226832 A1 | 9/2011 | Bayne et al. |
| 2011/0281093 A1 | 11/2011 | Gulati et al. |
| 2011/0293942 A1 | 12/2011 | Cornejo et al. |
| 2011/0294648 A1* | 12/2011 | Chapman ................ C03C 3/097 |
| | | 501/63 |
| 2012/0015150 A1 | 1/2012 | Suzuki |
| 2012/0021898 A1 | 1/2012 | Elam et al. |
| 2012/0040146 A1 | 2/2012 | Garner et al. |
| 2012/0048604 A1 | 3/2012 | Cornejo et al. |
| 2012/0052271 A1 | 3/2012 | Gomez et al. |
| 2012/0052275 A1 | 3/2012 | Hashimoto et al. |
| 2012/0083401 A1 | 4/2012 | Koyama et al. |
| 2012/0114955 A1 | 5/2012 | Almoric et al. |
| 2012/0135848 A1 | 5/2012 | Beall et al. |
| 2012/0171497 A1 | 7/2012 | Koyama et al. |
| 2012/0174497 A1 | 7/2012 | Kroes |
| 2012/0189843 A1 | 7/2012 | Chang et al. |
| 2012/0194974 A1 | 8/2012 | Weber et al. |
| 2012/0196110 A1 | 8/2012 | Murata et al. |
| 2012/0206406 A1 | 8/2012 | Kim et al. |
| 2012/0216565 A1 | 8/2012 | Allan et al. |
| 2012/0216569 A1 | 8/2012 | Allan et al. |
| 2012/0219792 A1 | 8/2012 | Yamamoto et al. |
| 2012/0235953 A1 | 9/2012 | Kim et al. |
| 2012/0236526 A1 | 9/2012 | Weber |
| 2012/0264585 A1 | 10/2012 | Ohara et al. |
| 2012/0297829 A1 | 11/2012 | Endo et al. |
| 2012/0308827 A1 | 12/2012 | Boek et al. |
| 2012/0321898 A1 | 12/2012 | Meinhardt et al. |
| 2013/0007458 A1 | 1/2013 | Wakita et al. |
| 2013/0017380 A1 | 1/2013 | Murata et al. |
| 2013/0045375 A1* | 2/2013 | Gross ................ C03C 10/0018 |
| | | 428/220 |
| 2013/0050992 A1 | 2/2013 | Schneider et al. |
| 2013/0101596 A1 | 4/2013 | Demartino et al. |
| 2013/0101798 A1 | 4/2013 | Hashimoto |
| 2013/0122260 A1 | 5/2013 | Liang |
| 2013/0186139 A1 | 7/2013 | Tanii |
| 2013/0189486 A1 | 7/2013 | Wang et al. |
| 2013/0202868 A1 | 8/2013 | Barefoot et al. |
| 2013/0203583 A1 | 8/2013 | Zhang et al. |
| 2013/0209751 A1 | 8/2013 | Zhang et al. |
| 2013/0219966 A1 | 8/2013 | Hasegawa et al. |
| 2013/0236699 A1 | 9/2013 | Prest et al. |
| 2013/0240025 A1 | 9/2013 | Bersano et al. |
| 2013/0274085 A1 | 10/2013 | Beall et al. |
| 2013/0288001 A1 | 10/2013 | Murata et al. |
| 2013/0288010 A1 | 10/2013 | Akarapu et al. |
| 2013/0309613 A1 | 11/2013 | O'Malley et al. |
| 2013/0323444 A1 | 12/2013 | Ehemann et al. |
| 2014/0050911 A1 | 2/2014 | Mauro et al. |
| 2014/0063393 A1 | 3/2014 | Zhong et al. |
| 2014/0066284 A1 | 3/2014 | Hashimoto et al. |
| 2014/0087159 A1 | 3/2014 | Cleary et al. |
| 2014/0087193 A1 | 3/2014 | Cites et al. |
| 2014/0087194 A1 | 3/2014 | Dejneka et al. |
| 2014/0090864 A1 | 4/2014 | Paulson |
| 2014/0093702 A1 | 4/2014 | Kitajima |
| 2014/0106141 A1 | 4/2014 | Bellman et al. |
| 2014/0106172 A1 | 4/2014 | Dejneka et al. |
| 2014/0109616 A1 | 4/2014 | Varshneya |
| 2014/0113141 A1 | 4/2014 | Yamamoto et al. |
| 2014/0134397 A1 | 5/2014 | Amin et al. |
| 2014/0139978 A1 | 5/2014 | Kwong |
| 2014/0141226 A1 | 5/2014 | Bookbinder et al. |
| 2014/0147576 A1 | 5/2014 | Lewis et al. |
| 2014/0150525 A1 | 6/2014 | Okawa et al. |
| 2014/0151370 A1 | 6/2014 | Chang et al. |
| 2014/0154661 A1 | 6/2014 | Bookbinder et al. |
| 2014/0170380 A1 | 6/2014 | Murata et al. |
| 2014/0193606 A1 | 7/2014 | Kwong |

(56) References Cited

U.S. PATENT DOCUMENTS

| | | | |
|---|---|---|---|
| 2014/0220327 A1 | 8/2014 | Adib et al. |
| 2014/0227524 A1 | 8/2014 | Ellison et al. |
| 2014/0227525 A1 | 8/2014 | Matsuda et al. |
| 2014/0234607 A1 | 8/2014 | Matsuda et al. |
| 2014/0248495 A1 | 9/2014 | Matsuda et al. |
| 2014/0308526 A1 | 10/2014 | Chapman et al. |
| 2014/0321124 A1 | 10/2014 | Schneider et al. |
| 2014/0335330 A1 | 11/2014 | Bellman et al. |
| 2014/0356576 A1 | 12/2014 | Dejneka et al. |
| 2014/0356605 A1 | 12/2014 | Adib et al. |
| 2014/0364298 A1 | 12/2014 | Ohara et al. |
| 2014/0370302 A1 | 12/2014 | Amin et al. |
| 2015/0004390 A1 | 1/2015 | Kawamoto et al. |
| 2015/0011811 A1 | 1/2015 | Pavone et al. |
| 2015/0027169 A1 | 1/2015 | Fredholm |
| 2015/0030834 A1 | 1/2015 | Morey et al. |
| 2015/0030838 A1 | 1/2015 | Sellier et al. |
| 2015/0037543 A1 | 2/2015 | Keegan et al. |
| 2015/0037586 A1 | 2/2015 | Gross |
| 2015/0044473 A1 | 2/2015 | Murata et al. |
| 2015/0052949 A1 | 2/2015 | Bayne et al. |
| 2015/0060401 A1 | 3/2015 | Chang et al. |
| 2015/0064472 A1 | 3/2015 | Gross et al. |
| 2015/0064474 A1 | 3/2015 | Dejneka et al. |
| 2015/0074974 A1 | 3/2015 | Pesansky et al. |
| 2015/0083200 A1 | 3/2015 | Hickman et al. |
| 2015/0093581 A1 | 4/2015 | Murata et al. |
| 2015/0111030 A1 | 4/2015 | Miyasaka et al. |
| 2015/0132563 A1 | 5/2015 | O'Malley et al. |
| 2015/0140325 A1 | 5/2015 | Gross et al. |
| 2015/0147574 A1 | 5/2015 | Allan et al. |
| 2015/0147575 A1 | 5/2015 | Dejneka et al. |
| 2015/0147576 A1 | 5/2015 | Bookbinder et al. |
| 2015/0152003 A1 | 6/2015 | Kawamoto et al. |
| 2015/0157533 A1 | 6/2015 | Demartino et al. |
| 2015/0166401 A1 | 6/2015 | Yamamoto |
| 2015/0166407 A1 | 6/2015 | Varshneya et al. |
| 2015/0175469 A1 | 6/2015 | Tabe |
| 2015/0239776 A1 | 8/2015 | Amin et al. |
| 2015/0251947 A1 | 9/2015 | Lestrigant et al. |
| 2015/0261363 A1 | 9/2015 | Shah et al. |
| 2015/0274585 A1 | 10/2015 | Rogers et al. |
| 2015/0329413 A1 | 11/2015 | Beall et al. |
| 2015/0329418 A1 | 11/2015 | Murata et al. |
| 2015/0368148 A1 | 12/2015 | Duffy et al. |
| 2015/0368153 A1 | 12/2015 | Pesansky et al. |
| 2016/0083291 A1 | 3/2016 | Dogimont et al. |
| 2016/0102014 A1 | 4/2016 | Hu et al. |
| 2016/0107924 A1 | 4/2016 | Yamamoto et al. |
| 2016/0187994 A1 | 6/2016 | La et al. |
| 2016/0265368 A1 | 9/2016 | Bencini et al. |
| 2016/0318796 A1 | 11/2016 | Masuda |
| 2016/0333776 A1 | 11/2016 | Andersson et al. |
| 2017/0158556 A1 | 6/2017 | Dejneka et al. |
| 2017/0197869 A1 | 7/2017 | Beall et al. |
| 2017/0197870 A1 | 7/2017 | Finkeldey et al. |
| 2017/0305786 A1 | 10/2017 | Roussev et al. |
| 2019/0208652 A1 | 7/2019 | Gross et al. |

FOREIGN PATENT DOCUMENTS

| | | | |
|---|---|---|---|
| CN | 1312582 A | 9/2001 |
| CN | 1693247 A | 11/2005 |
| CN | 1699230 A | 11/2005 |
| CN | 1759074 A | 4/2006 |
| CN | 1886348 A | 12/2006 |
| CN | 101316799 A | 12/2008 |
| CN | 101578240 A | 11/2009 |
| CN | 101583576 A | 11/2009 |
| CN | 101679106 A | 3/2010 |
| CN | 101689376 A | 3/2010 |
| CN | 102026929 A | 4/2011 |
| CN | 102089252 A | 6/2011 |
| CN | 102131740 A | 7/2011 |
| CN | 102149649 A | 8/2011 |
| CN | 102363567 A | 2/2012 |
| CN | 102393289 A | 3/2012 |
| CN | 102531384 A | 7/2012 |
| CN | 102690059 A | 9/2012 |
| CN | 102791646 A | 11/2012 |
| CN | 102815860 A | 12/2012 |
| CN | 102887650 A | 1/2013 |
| CN | 102898022 A | 1/2013 |
| CN | 102958855 A | 3/2013 |
| CN | 103058506 A | 4/2013 |
| CN | 103058507 A | 4/2013 |
| CN | 103068759 A | 4/2013 |
| CN | 103097319 A | 5/2013 |
| CN | 103282318 A | 9/2013 |
| CN | 103328396 A | 9/2013 |
| CN | 103333926 A | 10/2013 |
| CN | 103569015 A | 2/2014 |
| CN | 103648996 A | 3/2014 |
| CN | 103946166 A | 7/2014 |
| CN | 103987671 A | 8/2014 |
| CN | 104114503 A | 10/2014 |
| CN | 104379522 A | 2/2015 |
| CN | 104619665 A | 5/2015 |
| CN | 104736496 A | 6/2015 |
| CN | 105293901 A | 2/2016 |
| CN | 105753314 A | 7/2016 |
| CN | 107108345 A | 8/2017 |
| CN | 107848870 A | 3/2018 |
| CN | 108046589 A | 5/2018 |
| CN | 207671927 U | 7/2018 |
| CN | 109071316 A | 12/2018 |
| DE | 112011100664 B4 | 12/2020 |
| EP | 0132751 A1 | 2/1985 |
| EP | 0163873 A1 | 12/1985 |
| EP | 0700879 A1 | 3/1996 |
| EP | 0931028 A1 | 7/1999 |
| EP | 1291631 A1 | 3/2003 |
| EP | 1314704 A1 | 5/2003 |
| EP | 1593658 A1 | 11/2005 |
| EP | 2263979 A1 | 12/2010 |
| EP | 2397449 A1 | 12/2011 |
| EP | 2415724 A1 | 2/2012 |
| EP | 2531459 A2 | 12/2012 |
| EP | 2540682 A1 | 1/2013 |
| EP | 2594536 A1 | 5/2013 |
| EP | 2609047 A1 | 7/2013 |
| EP | 2646243 A1 | 10/2013 |
| EP | 2666756 A1 | 11/2013 |
| EP | 2695734 A1 | 2/2014 |
| EP | 2736855 | 6/2014 |
| EP | 2762459 A1 | 8/2014 |
| EP | 2762460 A1 | 8/2014 |
| EP | 3204338 A2 | 8/2017 |
| GB | 1012367 A | 12/1965 |
| GB | 1026770 A | 4/1966 |
| GB | 1089912 A | 11/1967 |
| GB | 1105433 A | 3/1968 |
| GB | 1334828 A | 10/1973 |
| JP | 47-004192 U | 9/1972 |
| JP | 54-083923 A | 7/1979 |
| JP | 62-187140 A | 8/1987 |
| JP | 02-293345 A | 12/1990 |
| JP | 07-263318 A | 10/1995 |
| JP | 11-328601 A | 11/1999 |
| JP | 2000-203872 A | 7/2000 |
| JP | 2000-327365 A | 11/2000 |
| JP | 2001-076336 A | 3/2001 |
| JP | 2001-354446 A | 12/2001 |
| JP | 2002-115071 A | 4/2002 |
| JP | 2002-174810 A | 6/2002 |
| JP | 2002-358626 A | 12/2002 |
| JP | 2003-505327 A | 2/2003 |
| JP | 2003-283028 A | 10/2003 |
| JP | 2004-099370 A | 4/2004 |
| JP | 2004-259402 A | 9/2004 |
| JP | 2005-062592 A | 3/2005 |
| JP | 2005-139031 A | 6/2005 |
| JP | 2005-519997 A | 7/2005 |
| JP | 2005-206406 A | 8/2005 |

(56) References Cited

FOREIGN PATENT DOCUMENTS

| | | |
|---|---|---|
| JP | 2005-289683 A | 10/2005 |
| JP | 2005-289685 A | 10/2005 |
| JP | 2005-320234 A | 11/2005 |
| JP | 2006-228431 A | 8/2006 |
| JP | 2007-527354 A | 9/2007 |
| JP | 2007-252589 A | 10/2007 |
| JP | 2007-255139 A | 10/2007 |
| JP | 2007-255319 A | 10/2007 |
| JP | 2007-314521 A | 12/2007 |
| JP | 2008-007384 A | 1/2008 |
| JP | 2008-094713 A | 4/2008 |
| JP | 2008-115071 A | 5/2008 |
| JP | 2009-084076 A | 4/2009 |
| JP | 2009-099239 A | 5/2009 |
| JP | 2009-107878 A | 5/2009 |
| JP | 2009-274902 A | 11/2009 |
| JP | 2009-280478 A | 12/2009 |
| JP | 2010-202514 A | 9/2010 |
| JP | 2011-057504 A | 3/2011 |
| JP | 2011-213576 A | 10/2011 |
| JP | 2011-527661 | 11/2011 |
| JP | 2011-530470 A | 12/2011 |
| JP | 2012-066995 A | 4/2012 |
| JP | 2012-232882 A | 11/2012 |
| JP | 2013-502371 A | 1/2013 |
| JP | 2013-028512 A | 2/2013 |
| JP | 2013-035721 A | 2/2013 |
| JP | 2013-518800 A | 5/2013 |
| JP | 2013-520388 A | 6/2013 |
| JP | 2013-529172 A | 7/2013 |
| JP | 2013-533838 A | 8/2013 |
| JP | 2013-536155 A | 9/2013 |
| JP | 2013-542159 A | 11/2013 |
| JP | 2013-544227 A | 12/2013 |
| JP | 2014-012611 A | 1/2014 |
| JP | 2014-501214 A | 1/2014 |
| JP | 2014-073953 A | 4/2014 |
| JP | 5483923 B2 | 5/2014 |
| JP | 2014-136751 A | 7/2014 |
| JP | 2014-141363 A | 8/2014 |
| JP | 2014-522798 A | 9/2014 |
| JP | 2015-511537 A | 4/2015 |
| JP | 2015-511573 A | 4/2015 |
| JP | 2017-502188 A | 1/2017 |
| JP | 2017-502202 A | 1/2017 |
| KR | 10-1181342 B1 | 9/2012 |
| KR | 10-2012-0128657 A | 11/2012 |
| KR | 10-2013-0100235 A | 9/2013 |
| KR | 10-1302664 B1 | 9/2013 |
| KR | 1302664 B1 | 9/2013 |
| KR | 10-1328832 B1 | 11/2013 |
| KR | 10-2013-0135840 A | 12/2013 |
| KR | 10-2014-0131558 A | 11/2014 |
| KR | 10-1506378 B1 | 3/2015 |
| KR | 10-2016-0080048 | 7/2016 |
| KR | 10-2021-0149192 A | 12/2021 |
| RU | 2127711 C1 | 3/1999 |
| SG | 187326 | 2/2013 |
| SU | 1677028 A1 | 9/1991 |
| TW | 200911718 A | 3/2009 |
| TW | 201040118 A | 11/2010 |
| TW | 201313635 A | 4/2013 |
| TW | 201331148 A | 8/2013 |
| TW | 201335092 A | 9/2013 |
| TW | 201341324 A | 10/2013 |
| TW | 201350449 A | 12/2013 |
| TW | 201402490 A | 1/2014 |
| TW | 201520178 A | 6/2015 |
| WO | 99/06334 A1 | 2/1999 |
| WO | 2000/047529 A1 | 8/2000 |
| WO | 01/07374 A1 | 2/2001 |
| WO | 2005/042423 A1 | 5/2005 |
| WO | 2005/091021 A1 | 9/2005 |
| WO | 2005/093720 A1 | 10/2005 |
| WO | 2009/041348 A1 | 4/2009 |
| WO | 2009/041618 A1 | 4/2009 |
| WO | 2010/002477 A1 | 1/2010 |
| WO | 2010/005578 A1 | 1/2010 |
| WO | 2010/014163 A1 | 2/2010 |
| WO | 2010/016928 A2 | 2/2010 |
| WO | 2010/147650 A2 | 12/2010 |
| WO | 2011/022661 A2 | 2/2011 |
| WO | 2011/041484 A1 | 4/2011 |
| WO | 2011/069338 A1 | 6/2011 |
| WO | 2011/077756 A1 | 6/2011 |
| WO | 2011/085190 A1 | 7/2011 |
| WO | 2011/097314 A2 | 8/2011 |
| WO | 2011/103798 A1 | 9/2011 |
| WO | 2011/103799 A1 | 9/2011 |
| WO | 2011/104035 A2 | 9/2011 |
| WO | 2011/149740 A1 | 12/2011 |
| WO | 2011/149811 A1 | 12/2011 |
| WO | 2011/149812 A1 | 12/2011 |
| WO | 2012/027660 A1 | 3/2012 |
| WO | 2012/074983 A1 | 6/2012 |
| WO | 2012/126394 A1 | 9/2012 |
| WO | 2013/016157 A1 | 1/2013 |
| WO | 2013/018774 A1 | 2/2013 |
| WO | 2013/027651 A1 | 2/2013 |
| WO | 2013/028492 A1 | 2/2013 |
| WO | 2013/032890 A1 | 3/2013 |
| WO | 2013/047679 A1 | 4/2013 |
| WO | 2013/074779 A1 | 5/2013 |
| WO | 2013/082246 A1 | 6/2013 |
| WO | 2013/088856 A1 | 6/2013 |
| WO | 2013/110721 A1 | 8/2013 |
| WO | 2013/116420 A1 | 8/2013 |
| WO | 2013/120721 A1 | 8/2013 |
| WO | 2013/130653 A2 | 9/2013 |
| WO | 2013/130665 A2 | 9/2013 |
| WO | 2013/130721 A1 | 9/2013 |
| WO | 2013/136013 A2 | 9/2013 |
| WO | 2013/184205 A1 | 12/2013 |
| WO | 2014/042244 A1 | 3/2014 |
| WO | 2014/052229 A1 | 4/2014 |
| WO | 2014/097623 A1 | 6/2014 |
| WO | 2014/100432 A1 | 6/2014 |
| WO | 2014/175144 A1 | 10/2014 |
| WO | 2014/180679 A1 | 11/2014 |
| WO | 2015/057552 A2 | 4/2015 |
| WO | 2015/057555 A1 | 4/2015 |
| WO | 2015/077179 A1 | 5/2015 |
| WO | 2015/080043 A1 | 6/2015 |
| WO | 2015/127483 A2 | 8/2015 |
| WO | 2015/175595 A1 | 11/2015 |
| WO | 2015/195419 A2 | 12/2015 |
| WO | 2015/195465 A1 | 12/2015 |
| WO | 2016/014937 A1 | 1/2016 |
| WO | 2016/028554 A1 | 2/2016 |
| WO | 2016/057785 A1 | 4/2016 |
| WO | 2016/057787 A2 | 4/2016 |
| WO | 2016/070048 A1 | 5/2016 |
| WO | 2016/073539 A1 | 5/2016 |
| WO | 2016/174825 A1 | 11/2016 |
| WO | 2016/185934 A1 | 11/2016 |
| WO | 2016/191676 A1 | 12/2016 |
| WO | 2017/030736 A1 | 2/2017 |
| WO | 2017/100646 A1 | 6/2017 |
| WO | 2017/177109 A1 | 10/2017 |
| WO | 2017/177114 A1 | 10/2017 |

OTHER PUBLICATIONS

Shen et al; "Control of concentration profiles in two step ion exchanged glasses"; Phys. Chem. Glasses, 2003 44 (4), 284-92.

Shen et al; "Variable-temperature ion-exchanged engineered stress profile (ESP) glasses"; J. Am. Ceram. Soc., 86 [11] 1979-81 (2003).

Smedskjaer "Effect of thermal history and chemical composition on hardness of silicate glasses"; Journal of Non-Crystalline Solids 356 (2010); pp. 893-897.

Stasser et al "Magnetic Resonance investigation of the process of corundum formation starting from sol-gel precursors", J. Am. Ceram. Soc, vol. 88, No. 10, pp. 2913-2922, 2005.

(56) References Cited

OTHER PUBLICATIONS

Takagi et al; "Electrostatic Imprint Process for Glass"; Applied Physics Express 1 (20008) 024003.
Tang et al. "Methods for measurement and statistical analysis of the frangibility of strengthened glass" Frontiers in Materials, 2015 vol 2, article 50. 8 pgs.
Tang, et al., "Automated Apparatus for Measuring the Frangibility and Fragmentation of Strengthened Glass", Experimental Mechanics (Jun. 2014) vol. 54 pp. 903-912.
Varshneya, "Chemical Strengthening of Glass: Lessons Learned and Yet to be Learned", International Journal of Applied Glass Science, vol. 1, No. 2, 2010, pp. 131-142.
Varshneya; "Fundamentals of Inorganic Glasses"; 2nd edition, Society of Glass Technology, 2006, pp. 513-521, XP002563094.
Varshneya; "Microhardness vs. Glass Composition"; Fundamentals of Inorganic Glasses; 2006; p. 208, paragraph 7.
Yong-Hwan; "Chemical Tempered Glass for Mobile Displays"; Korea Institute of Science and Technology; 2020; 6 Pages.
Zheng et al., "Structure and Properties of the Lithium Aluminosilicate Glasses with Yttria Addition", Wuhan University of Technology, vol. 22, No. 2, 2007, pp. 362-366.
Zheng et al; "Effect of Y2O3 addition on viscosity and crystallizationof the lithium aluminosilicate glasses"; Thermochimica Acta 456 (2007) 69-74.
Zimmer, "Thin Glasses for Touch Display Technologies" Schott: glass made of ideas. Emerging Display Technologies Conference, Aug. 16-17, 2011. 17 slides.
Bansal et al., "Handbook'of Glass Properties", 1986, 10 pages.
Timoshenko et al., "Theory of Elasticity", 2nd Edition, 1951, 14 pages.
"Building Materials", Co-edited by Xi'an University of Architecture and Technology, China Construction Industry Press, Edition 3, Apr. 30, 2004, 5 pages.
Abrams et al; "Fracture behavior of engineered stress profile soda lime silicate glass"; Journal of Non-Crystalline Solids; 321, (2003) 10-19.
Aegerter et al; "Sol-gel technologies for glass producers and users—Chapter 4.1.8—Scratch resistant coatings (G. Helsch and G. H. Frischat)", pp. 217-221, Kluwer Academic Publishers, 2004.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM C158-02(2012), Standard Test Methods for Strength of Glass by Flexure (Determination of Modulus of Rupture), ASTM International, West Conshohocken, PA, 2012, 9 pages.
Bahlawane "Novel sol-gel process depositing a-Al2O3 for the improvement of graphite oxidation-resistance"—Thin Solid Films, vol. 396, pp. 126-130, 2001.
Bansal et al; "Chapter 10: Elastic Properties" Handbook of Glass Properties; Elsevier; (1986) pp. 306-336.
Bansal et al; "Handbook of Glass Properties"; Elsevier; (1986) 2 pages.
Barnett Technical Services, "Surface Stress Meters", Available Online at <https://web.archive.org/web/20200925054825/https:// barnett-technical.com/luceo/surface-stress/>, Retrieved on Sep. 25, 2020, 4 pages.
Bouyne et al; "Fragmentation of thin chemically tempered glass plates"; Glass Technol., 2002, 43C, 300-2.
Brandt et al; "Mechanics of Ceramics, Active Materials, Nanoscale Materials, Composites, Glass, and Fundamentals"; Proceedings of the 8th International Symposium on Fracture Mechanics of Ceramics, (2003); 11 Pages.
Brunkov et al; "Submicron-Resolved Relief Formation in Poled Glasses and Glass-Metal Nanocomposites"; Technical Physics Letters, 2008, vol. 34, No. 12 pp. 1030-1033.
Bubsey, R.T et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).
ChemCor Product Specification, 1990.
Coming leads $62M Investment in 'smart' glass maker view, Jun. 19, 2013; http://optics.org/news/4/6/27.
Corning Incorporated, "What Makes ChemCor Glass Work?" ChemCor Product Specification, Feb. 1990, 2 pgs.
Corning, "Nook—Stress Profile Measurement", Corning Incorporated, 2019, 4 slides.
Declaration of Rostislav V. Roussev; 9 Pages; Aug. 11, 2019.
Dessler et al; "Differences between films and monoliths of sol-gel derived aluminas", Thin Solid Films, vol. 519, pp. 42-51, 2010.
Donald "Review Methods for Improving the Mechanical Properties of Oxide Glasses"; Journal of Materials Science 24 (1989) 4177-4208.
Dusil J. et al., "Black Colored Glass Ceramics Based on Beta-Quartz Solid Solutions," Glass 1977: proceedings of the 11th International Congress on Glass, Prague, Czechoslovakia, Jul. 4-8, 1977, vol. 2, pp. 139-149.
English translation of Japanese Patent Publication No. H11-328601, titled "Glass Substrate for Recording Medium, Recording Medium utilizing Glass Substrate, and Method for Manufacturing Glass Substrate for Recording Medium" Published Nov. 30, 1999. 11 pgs.
English translation of Japanese Patent Publication No. S47-004192, titled "Inorganic Glass for Watch" Published Feb. 4, 1972. 4 pgs.
F.V. Tooley; "The Flandbook of Glass Manufacture, vol. II"; China Architecture & Building Press, First Edition, Feb. 1983, pp. 304-305.
Fu et al, "Preparation of alumina films from a new sal-gel route" Thin Solid films 348, pp. 99-102 (1999).
Glass Technology, Chapter 09, retrieved on Feb. 1, 2021, pp. 146-158 (Original Document Only).
Glover et al., "The Interactive Whiteboard: a Literature Study"; Technology, Pedagogy and Education, vol. 14, 2, 2005, pp. 155-170.
Greaves et al; "Inorganic Glasses, glass-forming liquids and amorphizing solids" Advances in Physics; vol. 56, No. 1; 2007 pp. 1-166.
Green; "Section 2. Residual stress, brittle fracture and damage; Critical parameters in the processing of engineered stress profile glasses"; Journal of Non-Crystalline Solids, 316 (2003) 35-41.
Gulati, Frangibility of Tempered Soda-Lime Glass Sheet, Glass Processing Days, The Fifth International Conference on Architectural and Automotive Glass, Sep. 13-15, 1997.
Guo et al., "Nucleation and Crystallization Behavior of Li2O—Al2O3—SiO2 System Glass-Ceramic Containing Little Fluorine and No-Fluorine", J.Non-Cryst.Solids, 2005, vol. 351, No. 24-26, pp. 2133-2137.
Hampshire; "Oxynitride glasses, their properties and crystallization—a review"; Journal of Non-Crystalline Solids; vol. 316, 2003; pp. 64-73.
Hauk "Sol-gel preparation of scratch-resistant Al2O3 coatings on float glass", Glass Science and Technology: Glastechnische Berichte, 72(12), pp. 386, 1999.
Inaba et al., "Non-destructive Stress Measurement In Double Ion-Exchanged Glass Using Optical Guided-Waves anc Scattered Light", Journal Of The Ceramic Society Of Japan 2017, vol. 125, No. 11, pp. 814-820.
Kim Yong-Hwan, "Glass Reinforcement by Ion Exchange Method (ReSEAT Program)", Available Online at <http://www.reseat.re. kr>, Korea Institute of Science and Technology Information, retrieved in 2021, pp. 1-6 (Original Document Only).
Kim; "Glass Engineering"; Glass Technology 3rd Edition; (2009) 8 Pages.
Kitaigorodskii et al, In: Sb.Nauchn.Rabot Belor.Politekhn.Inst. ,Khimiya, Tekhnologiya i Istoriya Stekla i Keramiki, 1960, No. 86, p. 38. (The Synthesis of Thermo-stable glasses) Abstract Only.
Le Bourhis; "Glass Mechanics and Technology"; Wiley-VCH, Second Edition; (2014) 8 Pages.
Le Bourhis; "Hardness"; Glass Mechanics and Technology; 2008; pp. 170-174.
Liu et al, "Common Knowledge Evidence: Inorganic Non-Metallic Materials Technology", China University of Science and Technology Press, Sep. 2015, 1st edition.

(56) References Cited

OTHER PUBLICATIONS

Nagashima; "Chemical Strengthening of Glass"; Surface Technology; vol. 64, No. 8; (2013) pp. 434-438.

Peitl et al; "Thermal Shock Properties of Chemically Toughened Borosilicate Glass"; Journal of Non-Crystallin Solids, 247, (1999) pp. 39-49.

Pflitsch et al; "Sol-gel deposition of chromium doped aluminum oxide films (Ruby) for surface temperature sensoi applicalion", Chem. Maler., vol. 20, pp. 2773-2778, 2008.

Poumellec et al; "Surface topography change induced by poling in Ge doped silica glass films" ; 2003 OSA/BGPP 2003 MD 38.

Reddy et al. "Fracture Toughness Measurement of Glass and Ceramic Materials Using Chevron-Notched Specimens" J. Am. Ceram. Soc. 71 (6) C-310-C313 (1988).

Reseat, Available Online at <https://www.reseat.or.kr/static/view/forPrint.jsp?siteId=portal>, Retrieved on Jan. 19, 2021, 1 page (Original Document Only).

Rukmani et al., "Effects of V and Mn Colorants on the Crystallization Behavior and Optical Properties of Ce-Doped Li-Disilicate Glass", In Journal Of American Ceramic Society, vol. 90, 2007, pp. 706-711.

Rusan et al; "A New Method for Recording Phase Optical Structures in Glasses"; Glass Physics and Chemistry, 2010, vol. 36, No. 4, pp. 513-516.

Sglavo & Green, "Flaw-insensitive ion-exchanged glass: 11, Production and mechanical performance" J. Am. Ceram. Soc. 84(8) pp. 1832-1838 (2001).

\* cited by examiner

GLASSES HAVING NON-FRANGIBLE STRESS PROFILES

This application is a divisional application and claims the benefit of priority under 35 U.S.C. § 120 of U.S. application Ser. No. 17/487,302 filed on Sep. 28, 2021, which in turn, is a divisional application and claims the benefit of priority under 35 U.S.C. § 120 of U.S. application Ser. No. 14/737,701 filed on Jun. 12, 2015, which in turn, claims the benefit of priority under 35 U.S.C. § 119 of U.S. Provisional Application Ser. No. 62/014,372, filed on Jun. 19, 2014, the contents of each of which are relied upon and incorporated herein by reference in their entireties.

BACKGROUND

The disclosure relates to strengthened glass. More particularly, the disclosure relates to strengthened glasses that do not exhibit frangible behavior.

Chemically strengthened glass is widely used as cover glass for mobile devices, touch-enabled displays, and the like. In general, non-frangible ion exchanged glass is preferred as a cover glass for touch-screen devices in order to reduce the risk of user injury from small glass pieces due to self-accelerating highly fragmented fracture that is characteristic of highly-frangible stress conditions. Such conditions are often produced as a result of combinations of excessive compressive stress and center tension in the sample. Recently disclosed criteria for non-frangibility based on a thickness-dependent maximum center tension (CT) are valid for relatively small thicknesses (i.e., <0.8 mm) only in the regime when the depth of the compressive layer (DOL) achieved by chemical strengthening is substantially smaller than the sample thickness.

SUMMARY

A glass exhibiting non-frangible behavior in a region where substantially higher central tension is possible without reaching frangibility is provided. This region allows greater extension of the depth of compression in which fracture-causing flaws are arrested without rendering the glass frangible despite the presence of a high central tension region in the sample.

Strengthened glasses that have deep compressive layers and do not exhibit frangible behavior (i.e., the glasses are non-frangible) are provided. The glasses have surface compressive layers extending from the surface to a depth of compression DOC that is at least about 8% (0.08t, where t is the thickness of the glass) of the total thickness of the glass, and a compressive stress CS and physical central tension CT, wherein CT−CS≤350 MPa, which, when applying the convention normally used in the art (i.e., compression is expressed as a negative (<0) stress and tension is expressed as a positive (>0) stress), may be alternatively expressed as |CT|+|CS|≤350 MPa.

Accordingly, one aspect of the disclosure is to provide a glass having a compressive layer extending from a surface of the glass to a depth of compression DOC and under a maximum compressive stress CS, a central region having a maximum physical central tension CT at a center of the glass, the central region extending outward from the center to the depth of compression, and a thickness t in a range from about 0.3 mm to about 1.0 mm, wherein DOC≥0.08·t and CT−CS≤350 MPa or, alternatively, |CT|+|CS|≤350 MPa.

A second aspect of the disclosure is to provide a glass having a compressive layer extending from a surface of the glass to a depth of compression DOC and under a maximum compressive stress CS, a central region having a maximum physical central tension CT at a center of the glass, the central region extending outward from the center to the depth of compression into the glass, and a thickness t in a range from about 0.3 mm to about 1.0 mm. The depth of compression DOC is greater than or equal to 0.08·t and the glass has an average elastic energy density of less than about 200 J/m² mm.

A third aspect of the disclosure is to provide a glass comprising: a compressive layer extending from a surface of the glass to a depth of compression DOC, the compressive surface layer having a maximum compressive stress CS; a central region having a maximum physical central tension CT at a center of the glass. The central region extends outward from the center of the glass to the depth of compression. The glass has a thickness t in a range from about 0.3 mm to about 1.0 mm, wherein DOC≥0.08·t and CT−CS≤350 MPa or, alternatively, |CT|+|CS|≤350 MPa. The physical central tension CT is greater than $0.681 \times (57-9.0 \times \ln(t) + 49.3 \times (\ln(t))^2)$ when 0.3 mm≤t≤0.5 mm. The physical central tension CT is greater than $0.728 \times (57-9.0 \times \ln(t) + 49.3 \times (\ln(t))^2)$ when 0.5 mm≤t≤0.7 mm. The physical central tension CT is greater than $$0.755 \times \left(-38.7\left(\frac{\text{MPa}}{\text{mm}}\right) \times \ln(t)(\text{mm}) + 48.2(\text{MPa})\right) \text{MPa}$$

when 0.7 mm<t≤1.0 mm.

A fourth aspect of the disclosure is to provide a glass comprising: a compressive layer extending from a surface of the glass to a depth of compression DOC, the compressive surface layer having a maximum compressive stress CS; a central region having a maximum physical central tension CT at a center of the glass, the central region extending outward from the center of the glass to the depth of compression, wherein the glass has an average elastic energy density of less than 200 J/m²·mm; and a thickness t in a range from about 0.3 mm to about 1.0 mm, wherein DOC≥0.084. When 0.3 mm≤t≤0.5 mm, the physical central tension CT is greater than $0.681 \times (57-9.0 \times \ln(t) + 49.3 \times (\ln(t))^2)$ MPa. When 0.5 mm≤t≤0.7 mm, the physical central tension CT is greater than $0.728 \times (57-9.0 \times \ln(t) + 49.3 \times (\ln(t))^2)$ MPa, and when 7 mm<t≤1.0 mm, the physical central tension CT is greater than $$0.755 \times \left(-38.7 \left(\frac{\text{MPa}}{\text{mm}}\right) \times \ln(t)(\text{mm}) + 48.2 \ (\text{MPa})\right) \text{MPa}.$$

These and other aspects, advantages, and salient features will become apparent from the following detailed description, the accompanying drawings, and the appended claims.

DETAILED DESCRIPTION

Figure 1:
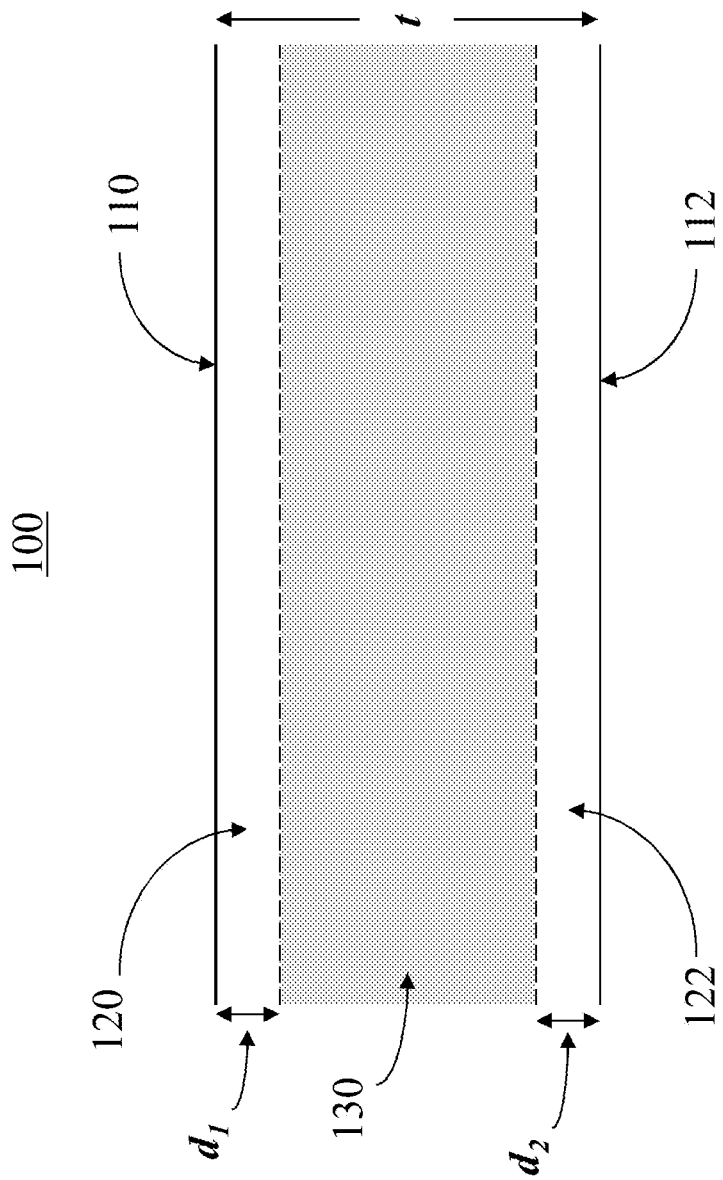
FIG. 1 is a schematic cross-sectional view of a chemically strengthened glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant (i.e., <0.1 mol %).

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "depth of layer" and "DOL" refer to the depth of the compressive layer as determined by surface stress (FSM) measurements using commercially available instruments such as the FSM-6000.

As used herein, the terms "depth of compression" and "DOC" refer to the depth at which the stress within the glass changes from compressive to tensile stress. At the DOC, the stress crosses from a positive (compressive) stress to a negative (tensile) stress and thus has a value of zero.

According to the convention normally used in the art, compression is expressed as a negative (<0) stress and tension is expressed as a positive (>0) stress. Throughout this description, however, compressive stress CS is expressed as a positive or absolute value—i.e., as recited herein, CS=|CS| and central tension or tensile stress is expressed as a negative value in order to better visualize the compressive stress profiles described herein, unless otherwise specified.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. The compressive layer extends from the surface to a depth within the glass and typically decrease from a maximum at the surface to 0 at the depth of compression DOC.

In one embodiment, the strengthened glasses described herein have a maximum compressive stress of at least about 150 MPa and, in some embodiments, at least about 200 MPa. In certain embodiments, the compressive stress is less than about 250 MPa.

A cross-sectional schematic view of an ion exchanged glass article is shown in FIG. 1. Glass article 100 has a thickness t, first surface 110, and second surface 112. While the embodiment shown in FIG. 1 depicts glass article 100 as a flat planar sheet or plate, the glass article may have other configurations, such as three dimensional shapes or other non-planar configurations. Glass article 100 has a first compressive region 120 extending from first surface 110 to a depth of compression (DOC) $d_1$ into the bulk of the glass article 100. In the embodiment shown in FIG. 1, glass article 100 also has a second compressive region 122 extending from second surface 112 to a second depth of compression (DOC) $d_2$. Glass article 100 also has a central region 130 that extends from $d_1$ to $d_2$. Central region 130 is under a tensile stress or physical central tension (CT), which balances or counteracts the compressive stresses of regions 120 and 122. The depths $d_1$, $d_2$ of first and second compressive regions 120, 122 protect the glass article 100 from the propagation of flaws introduced by sharp impact to first and second surfaces 110, 112 of glass article 100, while the compressive stress minimizes the likelihood of a flaw penetrating through the depth $d_1$, $d_2$ of first and second compressive regions 120, 122.

In some embodiments, the depth of compression DOC is at least about 8% of the total thickness t of the glass article—i.e., DOC 0.8t—and, in certain embodiments, DOC≥0.8t when the thickness t is greater than 0.75 mm. In other embodiments, the depth of compression DOC is at least about 9% of the thickness t (DOC≥0.8t) and, in certain embodiments, DOC≥0.9t when the thickness t is greater than 0.5 mm.

Compressive stress CS and depth of layer DOL are measured using those means known in the art. Such means include, but are not limited to, measurement of surface stress (FSM) using commercially available instruments such as, for example, the FSM-6000 stress meter, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. The SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The relationship between CS and physical central tension CT may, in some embodiments, be approximated by the expression:

$$CT = (CS \cdot DOL)/(t - 2\, DOL) \quad (1),$$

where t is the thickness, expressed in microns (μm), of the glass article. In various sections of the disclosure, central tensions CT and compressive stresses CS are expressed in megaPascals (MPa), thickness t is expressed in either microns (μm) or millimeters (mm), and depth of layer DOL is expressed in microns (μm).

For strengthened glass articles in which the compressive stress layers extend to deeper depths within the glass, the FSM technique may suffer from contrast issues, which affect the observed DOL value. At deeper DOL values, there may be inadequate contrast between the TE and TM spectra, thus making the calculation of the difference between TE and TM spectra—and determining the DOL—more difficult. Moreover, the FSM technique is incapable of determining the compressive stress profile (i.e., the variation of compressive stress as a function of depth within the glass). In addition, the FSM technique is incapable of determining the depth of layer resulting from the ion exchange of certain elements such as, for example, lithium.

The techniques described below have been developed to more accurately determine the depth of compression (DOC) and compressive stress profiles for strengthened glass articles.

In U.S. patent application Ser. No. 13/463,322, entitled "Systems And Methods for Measuring the Stress Profile of Ion-Exchanged Glass (hereinafter referred to as "Roussev I")," filed by Rostislav V. Roussev et al. on May 3, 2012, and claiming priority to U.S. Provisional Patent Application No. 61/489,800, having the same title and filed on May 25, 2011, two methods for extracting detailed and precise stress profiles (stress as a function of depth) of tempered or chemically strengthened glass are disclosed. The spectra of bound optical modes for TM and TE polarization are collected via prism coupling techniques, and used in their entirety to obtain detailed and precise TM and TE refractive index profiles $n_{TM}(z)$ and $n_{TE}(z)$. The contents of the above applications are incorporated herein by reference in their entirety.

In one embodiment, the detailed index profiles are obtained from the mode spectra by using the inverse Wentzel-Kramers-Brillouin (IWKB) method.

In another embodiment, the detailed index profiles are obtained by fitting the measured mode spectra to numerically calculated spectra of pre-defined functional forms that describe the shapes of the index profiles and obtaining the parameters of the functional forms from the best fit. The detailed stress profile S(z) is calculated from the difference of the recovered TM and TE index profiles by using a known value of the stress-optic coefficient (SOC):

$$S(z) = [n_{TM}(z) - n_{TE}(z)]/SOC \quad (2).$$

Due to the small value of the SOC, the birefringence $n_{TM}(z) - n_{TE}(z)$ at any depth z is a small fraction (typically on the order of 1%) of either of the indices $n_{TM}(z)$ and $n_{TE}(z)$. Obtaining stress profiles that are not significantly distorted due to noise in the measured mode spectra requires determination of the mode effective indices with a precision on the order of 0.00001 RIU. The methods disclosed in Roussev I further include techniques applied to the raw data to ensure such high precision for the measured mode indices, despite noise and/or poor contrast in the collected TE and TM mode spectra or images of the mode spectra. Such techniques include noise-averaging, filtering, and curve fitting to find the positions of the extremes corresponding to the modes with sub-pixel resolution.

Similarly, U.S. patent application Ser. No. 14/033,954, entitled "Systems and Methods for Measuring Birefringence in Glass and Glass-Ceramics (hereinafter "Roussev II")," filed by Rostislav V. Roussev et al. on Sep. 23, 2013, and claiming priority to U.S. Provisional Application Ser. No. 61/706,891, having the same title and filed on Sep. 28, 2012, discloses an apparatus and methods for optically measuring birefringence on the surface of glass and glass ceramics, including opaque glass and glass ceramics. Unlike Roussev I, in which discrete spectra of modes are identified, the methods disclosed in Roussev II rely on careful analysis of the angular intensity distribution for TM and TE light reflected by a prism-sample interface in a prism-coupling configuration of measurements. The contents of the above applications are incorporated herein by reference in their entirety.

Hence, correct distribution of the reflected optical intensity vs. angle is significantly more important than in traditional prism-coupling stress-measurements, where only the locations of the discrete modes are sought. To this end, the methods disclosed in Roussev 1 and Roussev II comprise techniques for normalizing the intensity spectra, including normalizing to a reference image or signal, correction for nonlinearity of the detector, averaging multiple images to reduce image noise and speckle, and application of digital filtering to further smooth the intensity of angular spectra. In addition, one method includes formation of a contrast signal, which is additionally normalized to correct for fundamental differences in shape between TM and TE signals. The aforementioned method relies on achieving two signals that are nearly identical and determining their mutual displacement with sub-pixel resolution by comparing portions of the signals containing the steepest regions. The birefringence is proportional to the mutual displacement, with a coefficient determined by the apparatus design, which includes prism geometry and index, focal length of the lens, and pixel spacing on the sensor. The stress is determined by multiplying the measured birefringence by a known stress-optic coefficient.

In another method, derivatives of the TM and TE signals are determined after application of some combination of the aforementioned signal conditioning techniques. The locations of the maximum derivatives of the TM and TE signals are obtained with sub-pixel resolution, and the birefringence is proportional to the spacing of the above two maxima, with a coefficient determined as before by the apparatus parameters.

Associated with the requirement for correct intensity extraction, the apparatus comprises several enhancements, such as using a light-scattering surface (static diffuser) in close proximity to or on the prism entrance surface to improve the angular uniformity of illumination, a moving diffuser for speckle reduction when the light source is coherent or partially coherent, and light-absorbing coatings on portions of the input and output facets of the prism and on the side facets of the prism to reduce parasitic background which tends to distort the intensity signal. In addition, the apparatus may include an infrared light source to enable measurement of opaque materials.

Furthermore, Roussev II discloses a range of wavelengths and attenuation coefficients of the studied sample, where measurements are enabled by the described methods and apparatus enhancements. The range is defined by $\alpha_s\lambda<250\pi\sigma s$, where $\alpha_s$ is the optical attenuation coefficient at measurement wavelength $\lambda$, and $\sigma_s$ is the expected value of the stress to be measured with typically required precision for practical applications. This wide range allows measurements of practical importance to be obtained at wavelengths where the large optical attenuation renders previously existing measurement methods inapplicable. For example, Roussev II discloses successful measurements of stress-induced birefringence of opaque white glass-ceramic at a wavelength of 1550 nm, where the attenuation is greater than about 30 dB/mm.

While it is noted above that there are some issues with the FSM technique at deeper DOL values, FSM is still a beneficial conventional technique which may utilized with the understanding that an error range of up to +/−20% is possible at deeper DOL values. The terms "depth of layer" and "DOL" as used herein refer to DOL values computed using the FSM technique, whereas the terms "depth of compression" and "DOC" refer to depths of the compressive layer determined by the methods described in Roussev I & II.

As stated above, the glass articles may be chemically strengthened by ion exchange. In this process, ions at or near the surface of the glass are replaced by—or exchanged with—larger ions having the same valence or oxidation state. In those embodiments in which the glass article comprises, consists essentially of, or consists of an alkali aluminosilicate glass, ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, and additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C. or to about 460° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The compressive stress is created by chemically strengthening the glass article, for example, by the ion exchange processes previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

Described herein are chemically strengthened glasses, such as Corning Gorilla® glass, that are used as a cover glass for mobile electronic devices and touch-enabled displays. In particular, development of chemically strengthened glass focuses on stress profiles with greater depth of the compressive layer that help reduce the probability of explosive or frangible glass fracture when the device is dropped on a hard, rough surface. Such fracture ejects glass pieces with substantial kinetic energy due to self-accelerating, highly fragmented fracture that is characteristic of highly-frangible stress conditions produced as a result of combinations of excessive compressive stress and central tension in the glass.

Frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Figure 10A:
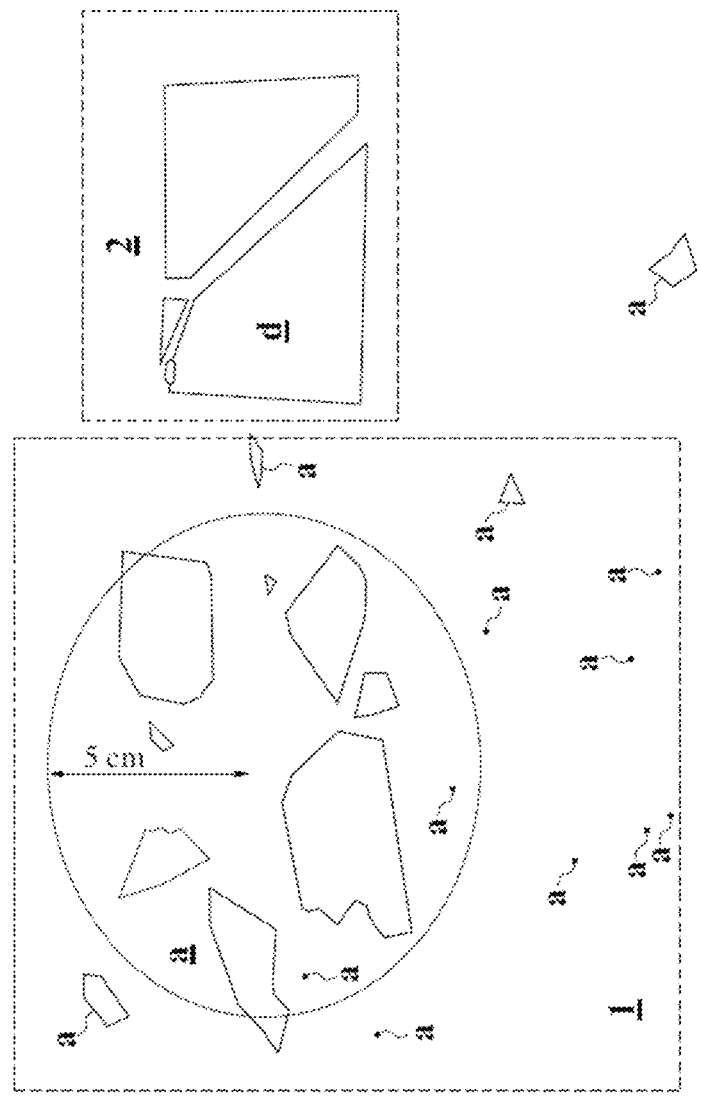
FIG. 10a is a photograph showing strengthened glass articles 1) exhibiting frangible behavior upon fragmentation; and 2) exhibiting non-frangible behavior upon fragmentation.
Figure 10B:
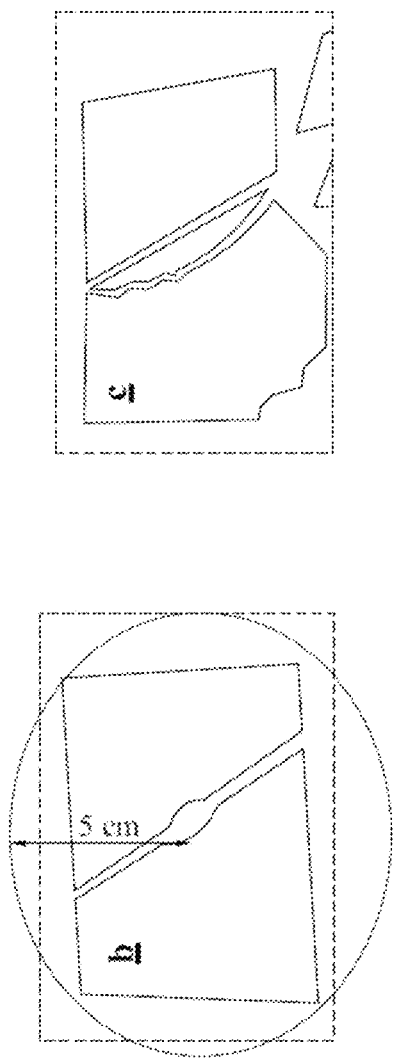
FIG. 10b is a photograph showing strengthened glass sheets that exhibit non-frangible behavior upon fragmentation.

Examples of frangible behavior and non-frangible behavior of strengthened glass articles upon point impact with a sharp indenter are shown in FIGS. 10a and 10b. The point impact test that is used to determine frangible behavior includes an apparatus that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT. The impact energy needed to create or activate the crack in a strengthened glass sheet depends upon the compressive stress CS and depth of layer DOL of the article, and thus upon the conditions under which the sheet was strengthened (i.e., the conditions used to strengthen a glass by ion exchange). Otherwise, each ion exchanged glass plate shown in FIGS. 10a and 10b was subjected to a sharp dart indenter (e.g., a SiC indenter) contact sufficient to propagate a crack into the inner region of the plate, the inner region being under tensile stress. The force applied to the glass plate was just sufficient to reach the beginning of the inner region, thus allowing the energy that drives the crack to come from the tensile stresses in the inner region rather than from the force of the dart impact on the outer surface. The degree of ejection may be determined, for example, by centering the glass sample on a grid, impacting the sample, and measuring the ejection distance of individual pieces using the grid.

Referring to FIG. 10a, glass plate a can be classified as being frangible. In particular, glass plate a fragmented into multiple small pieces that were ejected, and exhibited a large degree of crack branching from the initial crack to produce the small pieces. Approximately 50% of the fragments are less than 1 mm in size, and it is estimated that about 8 to 10 cracks branched from the initial crack. Glass pieces were also ejected about 5 cm from original glass plate a, as seen in FIG. 10a. A glass article that exhibits any of the three criteria (i.e., multiple crack branching, ejection, and extreme fragmentation) described hereinabove is classified as being frangible. For example, if a glass exhibits excessive branching alone but does not exhibit ejection or extreme fragmentation as described above, the glass is still characterized as frangible.

Glass plates b, c, (FIG. 10b) and d (FIG. 10a) are classified as not frangible. In each of these samples, the glass sheet has broken into a small number of large pieces. Glass plate b (FIG. 10b), for example, has broken into two large pieces with no crack branching; glass plate c (FIG. 10b) has broken into four pieces with two cracks branching from the initial crack; and glass plate d (FIG. 10a) has broken into four pieces with two cracks branching from the initial crack. Based on the absence of ejected fragments (i.e., no glass pieces forcefully ejected more than 2 inches from their original location), there are no visible fragments with a size of 1 mm or less, and the minimal amount of observed crack branching, samples b, c, and d are classified as non-frangible or substantially non-frangible.

Based on the foregoing, a frangibility index (Table 1) can be constructed to quantify the degree of frangible or non-frangible behavior of a glass, glass ceramic, and/or a ceramic article upon impact with another object. Index numbers, ranging from 1 for non-frangible behavior to 5 for highly frangible behavior, have been assigned to describe different levels of frangibility or non-frangibility. Using the index, frangibility can be characterized in terms of numerous parameters: 1) the percentage of the population of fragments having a diameter (i.e., maximum dimension) of less than 1 mm ("Fragment size" in Table 1); 2) the number of fragments formed per unit area (in this instance, $cm^2$) of the sample ("Fragment density" in Table 1); 3) the number of cracks branching from the initial crack formed upon impact ("Crack branching" in Table 1); and 4) the percentage of the population of fragments that is ejected upon impact more than about 5 cm (or about 2 inches) from their original position ("Ejection" in Table 1).

TABLE 1

Criteria for determining the degree of frangibility and frangibility index.

| Degree of frangibility | Frangibility index | Fragment size (% ≤ 1 mm) | Fragment density (fragments/$cm^2$) | Crack branching | Ejection (% ≥ 5 cm) |
|---|---|---|---|---|---|
| High | 5 | >20 | >7 | >9 | >6 |
| Medium | 4 | 10 < n ≤ 20 | 5 < n ≤ 7 | 7 < n ≤ 9 | 4 < n ≤ 6 |
| Low | 3 | 5 < n ≤ 10 | 3 < n ≤ 5 | 5 < n ≤ 7 | 2 < n ≤ 4 |
| None | 2 | 0 < n ≤ 5 | 1 < n ≤ 3 | 2 < n ≤ 5 | 0 < n ≤ 2 |
|  | 1 | 0 | n ≤ 1 | n ≤ 2 | 0 |

A frangibility index is assigned to a glass article if the article meets at least one of the criteria associated with a particular index value. Alternatively, if a glass article meets criteria between two particular levels of frangibility, the article may be assigned a frangibility index range (e.g., a frangibility index of 2-3). The glass article may be assigned the highest frangibility index value, as determined from the individual criteria listed in Table 1. In many instances, it is not possible to ascertain the values of each of the criteria, such as the fragmentation density or percentage of fragments ejected more than 5 cm from their original position, listed in Table 1. The different criteria are thus considered individual, alternative measures of frangible behavior and the frangibility index such that a glass article falling within one criteria level will be assigned the corresponding degree of frangibility and frangibility index. If the frangibility index based on any of the four criteria listed in Table 1 is 3 or greater, the glass article is classified as frangible.

Applying the foregoing frangibility index to the samples shown in FIGS. 10a and 10b, glass plate a fragmented into multiple ejected small pieces and exhibited a large degree of crack branching from the initial crack to produce the small pieces. Approximately 50% of the fragments are less than 1 mm in size and it is estimated that about 8 to 10 cracks branched from the initial crack. Based upon the criteria listed in Table 1, glass plate a has a frangibility index of between about 4-5, and is therefore classified as having a medium-high degree of frangibility.

A glass article having a frangibility index of less than 3 (low frangibility) may be considered to be non-frangible or substantially non-frangible. Glass plates b, c, and d each lack fragments having a diameter of less than 1 mm, multiple branching from the initial crack formed upon impact and fragments ejected more than 5 cm from their original position. Glass plates b, c, and d are non-frangible and thus have a frangibility index of 1 (not frangible).

As previously discussed, the observed differences in behavior between glass plate a, which exhibited frangible behavior, and glass plates b, c, and d, which exhibited non-frangible behavior, in FIGS. 10*a* and 10*b* may be attributed to differences in central tension CT among the samples tested. The possibility of such frangible behavior is one consideration in designing various glass products, such as cover plates or windows for portable or mobile electronic devices, including cellular phones, entertainment devices, and the like, as well as for displays for information terminal (IT) devices, such as laptop computers. Moreover, the depth of the compression layer DOL and the maximum value of compressive stress CS, that can be designed into or provided to a glass article are limited by such frangible behavior.

Accordingly, the strengthened glass articles described herein, in some embodiments, exhibit a frangibility index of less than 3 when subjected to a point impact sufficient to break the strengthened glass article. In other embodiments, non-frangible strengthened glass articles may achieve a frangibility index of less than 2 or 1.

Recently disclosed criteria for non-frangibility based on a thickness-dependent maximum physical central tension CT are valid for relatively small thicknesses (i.e., t<0.8 mm) only in the regime when the depth of layer (DOL) of chemical strengthening is substantially smaller than the sample thickness t (i.e., DOL<0.1t). As described herein, substantially higher central tension values than those previously disclosed without reaching the frangibility limit of the glass are possible when the DOL comprises a larger proportion of the overall thickness t. This additional region of non-frangibility allows further extension of the depth of compression without rendering the glass frangible despite the development of high central tension within the sample. The increased depth of the compressive layer enables deeper fracture-causing flaws to be arrested.

In one aspect of the invention, an upper limit of the sum of CS and CT which allows an increase of DOL without reaching frangibility is disclosed, including cases where the central tension CT increases very substantially above the most recently known CT frangibility limit, disclosed in U.S. Pat. No. 8,415,013, entitled "Strengthened Glass Articles and Methods of Making" by Kristen Barefoot et al. (referred to hereinafter as "Barefoot I"), issued on Apr. 9, 2013.

In one aspect, this upper limit of the sum of CS and CT is associated with an upper limit of the maximum spatial variation in $K^+$ concentration in a sample. This spatial variation that is obtained by a single-step ion exchange of $K^+$ for $Na^+$ in a glass substrate in which $Na^+$, or $Na^+$ and $K^+$, are the only alkali ions in the glass.

In another aspect, an additional criterion for frangibility based on total stored elastic energy is introduced, allowing prediction of frangibility stress conditions in cases where the DOL is a substantial fraction of the sample thickness t. In one embodiment, DOL>0.1t and, in other embodiments DOL>0.15t. Under these conditions, frangibility conditions are controlled for stress profiles obtained by either single-step or two-step ion exchange. In addition, the total stored elastic energy criterion allows correct control of frangibility for stress profiles obtained by simultaneous or multi-step ion exchange involving counter diffusion of more than two ions. The average elastic energy is the total elastic energy divided by the thickness t of the glass article.

The total-elastic-energy criterion allows quick non-destructive quality control of frangibility based on stress measurements such as prism coupling for single-ion exchange and compressive stress profiles obtained by double-ion exchange having large depths of layer.

Barefoot I describes the frangibility limit for glass thicknesses smaller than about 0.75 mm, where an extrapolation of an earlier-known linear dependence found for larger thicknesses underestimated the upper limit of the non-frangible design space. "Nonlinear threshold central tension $CT_1$" is given by the empirical formula $$CT_1 \text{ (MPa)} \leq -38.7 \text{ (MPa)} \times \ln(t) \text{ (mm)} + 48.2 \text{ (MPa)} \qquad (3),$$

where t is the sample thickness. Based on proper dimensional analysis, ln(t), where t is expressed in mm, is dimensionless. The dimensions of the coefficient of the ln(t) term is actually megaPascals (MPa), and are expressed as such. The CT measurement values that are compared to the above formula are approximated by the equation $$CT_A(CS, DOL, t) = (CS \times DOL)/(t - 2DOL) \qquad (4).$$

The term $CT_A$ signifies that the above approximation for finding CT has become accepted and widely used for process and quality control in the field of chemically strengthened glass. According to Barefoot I, the frangibility limit $CT_1$ ranges from 48.2 MPa for a substrate thickness of 1 mm to 94.8 MPa for a thicknesses of 0.3 mm.

In U.S. patent application Ser. No. 14/405,041, filed Dec. 12, 2014, by Kristen Barefoot et al., entitled "Strengthened Glass Articles and Methods of Making (referred to hereinafter as "Barefoot II")," an even higher nonlinear frangibility $CT_A$ limit is disclosed. The frangibility limit $CT_3$ is expressed as a function of thickness for the thickness range 0.1 mm-0.75 mm by the equation $$CT_3 \text{ (MPa)} = 57 \text{ (MPa)} - 9.0 \text{ (MPa)} \cdot \ln(t) + 49.3 \text{ (MPa)} \ln^2(t) \qquad (5).$$

Values of the nonlinear frangibility limits $CT_1$ and $CT_3$ for several thicknesses in the range 0.3 mm to 1 mm (0.3 mm to 0.75 mm in the case of $CT_3$) are summarized in Table 2. Thus, according to Barefoot I and Barefoot II, for thicknesses below 0.75 mm, glass in which $CT_A$ is greater than $CT_3$ poses an unacceptable risk (i.e., >5%) of being frangible. Similarly, for thicknesses above 0.75 mm, glass in which $CT_A$ is greater than $CT_1$ presents an unacceptable risk (>5%) of being frangible.

For thicknesses in the range 0.3 mm to 0.5 mm for the glass used by Barefoot I and Barefoot II, the onset of frangibility is observed when the DOL ranges between about 0.085t and 0.126t during ion exchange in nominally pure $KNO_3$. As can be seen from FIG. 2, the ratio of $CT_A$ to the physical CT (labeled $CT_{phys}$ in the equations below) ranges from about 1.373 to about 1.469 over that range of DOL/t, averaging about 1.421. Hence, the ratio $CT/CT_A$ ranges from about 0.681 to about 0.728, with an average value of about 0.704. Therefore, the physical CT limit corresponding to the prior-art $CT_A$ limit for thicknesses 0.3-0.5 mm ($CT_3$) is $$CT_{phys}^{(3)}(0.3 \text{ mm} \leq t \leq 0.5 \text{ mm}) = (0.681 \div 0.728) \times (57 - 9.0 \times \ln(t) + 49.3 \times (\ln(t))^2) \qquad (6).$$

For thicknesses between about 0.5 mm and about 0.75 mm, the ratio DOL/t at which frangibility occurs in the examples is in the range 0.064-0.085, where the ratio $CT_A/CT_{phys}$ is about 1.332 to about 1.374. Accordingly, the ratio $CT_{phys}/CT_A$ ranges from about 0.728 to about 0.751, and a frangibility limit in terms of physical center tension can be defined through its relation to the limit $CT_3$ of Barefoot II as $$CT_{phys}^{(3)}(0.5 \text{ mm} \leq t \leq 0.75 \text{ mm}) = (0.728 \div 0.751) \times (57 - 9.0 \times \ln(t) + 49.3 \times (\ln(t))^2)$$

For samples having a thickness greater than 0.75 mm and not greater than 1.0 mm, the relevant CT limit is $CT_1$, described in Barefoot I. The ratio of DOL/t at which frangibility occurs in the examples of Barefoot I is typically in the range 0.048 to 0.060, and the ratio $CT_A/CT_{phys}$ ranges from about 1.302 to about 1.324, the inverse of which ranges from 0.755 to 0.768.

Hence, for the thickness range 0.75 mm<t≤1.0 mm, the physical CT frangibility limit can be derived from the Barefoot II empirical frangibility limit:

$$CT_{phys}^{(1)}(0.75 \text{ mm} < t \leq 1.0 \text{ mm}) = \quad (8)$$

$$(0.755 \div 0.768) \times \left(-38.7 \left(\frac{\text{MPa}}{\text{mm}}\right) \times \ln(t)(\text{mm}) + 48.2 \text{ (MPa)}\right).$$

TABLE 2

Frangibility CT limits, expressed in terms of $CT_A$, for thicknesses between 0.3 mm and 1 mm, disclosed in Barefoot I and Barefoot II.

| t (mm) | 0.3 | 0.35 | 0.4 | 0.45 | 0.5 | 0.55 | 0.6 | 0.65 |
|---|---|---|---|---|---|---|---|---|
| $CT_1$ (MPa) | 94.8 | 88.8 | 83.7 | 79.1 | 75 | 71.3 | 68 | 64.9 |
| $CT_3$ (MPa) | 139.3 | 120.8 | 106.6 | 95.6 | 86.9 | 80 | 74.5 | 70 |

| t (mm) | 0.7 | 0.75 | 0.8 | 0.85 | 0.9 | 0.95 | 1 |
|---|---|---|---|---|---|---|---|
| $CT_1$ (MPa) | 62 | 59.3 | 56.8 | 54.5 | 52.3 | 50.2 | 48.2 |
| $CT_3$ (MPa) | 66.5 | 63.7 | | | | | |

As described herein, if the maximum CS in the glass and DOL are substantially different from those described by Barefoot I, the onset of frangibility may occur at substantially different $CT_A$ value for the glass having the same overall composition and thickness. In an alkali aluminosilicate glass containing approximately 16 mol % $Na_2O$ and essentially no $K_2O$, a 0.4-mm-thick substrate of the glass becomes frangible when ion exchanged in a bath containing essentially pure $KNO_3$ at 390° C. to a depth of layer of about 36 μm, as measured by a FSM-6000 surface stress meter. The compressive stress produced by the same surface stress meter during the measurement is about 920 MPa, and the $CT_A$ is about 101 MPa. However, when ion exchanged at 440° C. for 11.7 hours in a bath containing 37 wt % $NaNO_3$ and 63 wt % $KNO_3$ the glass having the same composition did not exhibit frangible behavior. Under these ion exchange conditions, the glass developed a CS of 301 MPa, a DOL of 114.7 μm as measured by FSM-6000, and a $CT_A$ of 202 MPa, which is almost twice as great as the $CT_3$ frangibility limit for 0.4 mm thickness (106.6 MPa, Table 2). In another example, the same type of glass was found frangible after ion exchange for 13.7 hours in the same bath and at the same temperature, with resulting compressive stress of 279 MPa with depth of layer DOL of 120.6 μm and $CT_A$=212 MPa. These experiments showed how the CT determined by the formula used in Barefoot I can have a frangibility-limit value that is twice as large when the DOL is 30% of the thickness (0.3t), compared with the pure-bath case when the depth of layer was only 9% of the thickness.

In related experiments, a sample having a thickness of 0.50 mm exhibited non-frangible behavior following ion exchange for 15.3 hours at 440° C. in the ion exchange bath containing 37% $NaNO_3$ and 63% $KNO_3$ by weight. The ion exchanged sample had CS of 304 MPa, DOL of 120.8 μm, and $CT_A$ of 142 MPa, which is substantially higher than the Barefoot II $CT_3$ limit of 86.9 MPa for 0.5 mm thick glass (Table 2).

Furthermore, frangibility was not observed for samples that were ion exchanged for times exceeding 25 hours at 440° C. in a bath containing 45 wt % $NaNO_3$ and 55% $KNO_3$. The DOL of these ion exchanged samples exceeding 150 μm. In one example, a 0.4 mm-thick sample acquired a CS of 213 MPa, DOL of at least 149.3 μm, and $CT_A$ of at least 314 MPa following ion exchange for 21 hours at 440° C. In another example, a 0.5 mm-thick sample acquired a CS of 221 MPa, DOL of at least 147 μm, and $CT_A$ of at least 172 MPa following ion exchange for 25.25 hours at 440° C. Following ion exchange for 25.25 hours at 440° C., a sample having a thickness of 0.6 mm acquired a CS of 254 MPa, DOL of at least 148 MPa, and $CT_A$ of at least 124 MPa, which is substantially greater than $CT_3$ of 74.5 MPa observed for 0.6 mm thick glass. A substrate with thickness of 0.8 mm acquired a CS of 272 MPa, DOL of at least 144 μm, and $CT_A$ of at least 76 MPa following ion exchange under the same conditions. This is substantially greater than the $CT_1$ value of 56.8 MPa observed for the same thickness and the $CT_3$ value of 59.3 MPa observed for a thickness of 0.75 mm. A 1.0 mm thick substrate had a CS of 278 MPa, which is substantially greater than the $CT_1$ value of 48.2 MPa obtained for the same thickness, a DOL of at least 142 μm, and a $CT_A$ of at least 55 MPa.

Following ion exchange at 440° C. for times exceeding 30 hours in a bath containing 50 wt % $NaNO_3$ and 50 wt % $KNO_3$, frangibility was not observed for 0.4 mm thick substrates, and depths of layer exceeding 170 μm were achieved. For ion exchange times of 14 hours and 20 minutes in the same bath, a compressive stress of 235 MPa, a DOL of at least 111 μm, and a $CT_A$ of at least 150 MPa were obtained. Following ion exchange for 16.7 hours at 440° C. in the 50 wt % $NaNO_3$/50 wt % KNO3 bath, a compressive stress of 227 MPa and DOL of at least 131 μm were measured, with $CT_A$ of at least 215 MPa. For ion exchange times of 17.7 to 20.7 hours, 25 hours, and 30 hours, the FSM-6000 was not able to estimate DOL and $CT_A$, but DOL would have been greater than 131 μm and $CT_A$ would have been greater than about 215 MPa.

Due to very limited ability to measure DOL beyond 100 μm DOL, and especially beyond about 130 μm DOL, the FSM-6000 instrument was unable to estimate the depth of layer and $CT_A$ for the deepest profiles. The FSM-6000 usually underestimates DOL when DOL is greater than about 100 μm—and especially when the DOL is greater than 130 μm—due to the limited ability of the instrument to resolve the dark lines of the mode spectrum, which become very dense when the DOL is very large.

In a related experiment, samples of the same glass with greater thicknesses of 0.5, 0.6, 0.8, and 1.0 mm were each ion exchanged for 26 hours and 43 hours at 440° C. in a bath containing 50 wt % $NaNO_3$ and 50 wt % $KNO_3$. All of the ion exchanged samples were non-frangible. Because the depths of layer of these samples exceeded 150 μm, the DOL and $CT_A$ could not be measured using the FSM-6000 instrument.

In the above examples, the DOL measured using the FSM-6000 instrument exceeded 0.1t, and the $CT_A$ value at which frangibility was first observed was significantly higher than the $CT_1$ frangibility values determined by the empirical equations of Barefoot I and Barefoot II.

As demonstrated by the above examples, when DOL>0.1t, as the allowable physical CT exceeds the $C_1$ and $CT_3$ frangibility limits previously prescribed and a combination of relatively high CS and large DOL can be used to obtain stronger glass.

The actual physical central tension inside the mid-plane of the sample usually differs from the approximate value $CT_A$, which has been widely adopted due to its ease of calculation based on the known thickness and the CS and DOL that are usually reported by the FSM-6000. Assuming that the associated index profile is a linear truncated profile, the FSM-6000 estimates DOL from the measured number of guided optical modes in the ion-exchanged layer. In practice, however, the index profile differs from a linear truncated profile, especially at the deeper end of the profile.

In many cases, the profile may be closely approximated by a complementary error function (erfc). This is usually the case when the effective diffusion coefficient of the ion exchange (mutual diffusion coefficient) varies relatively little over the concentration range spanned by the concentration profile of the diffusant. Such is the case for the $K^+$ for $Na^+$ exchange in the glass described by Barefoot I and Barefoot II, which disclosed the $CT_1$ and $CT_3$ frangibility limits observed in those glasses. The central tension CT for an erfc-shaped distribution of the $K^+$ concentration can be calculated by taking into account that the local change in specific volume is proportional to the local $K^+$ concentration and by applying the requirement of force balance, which requires that the spatial integral of the stress in the compression regions of the substrate be equal and opposite in sign to the integral of the stress over the tension region.

Figure 2:
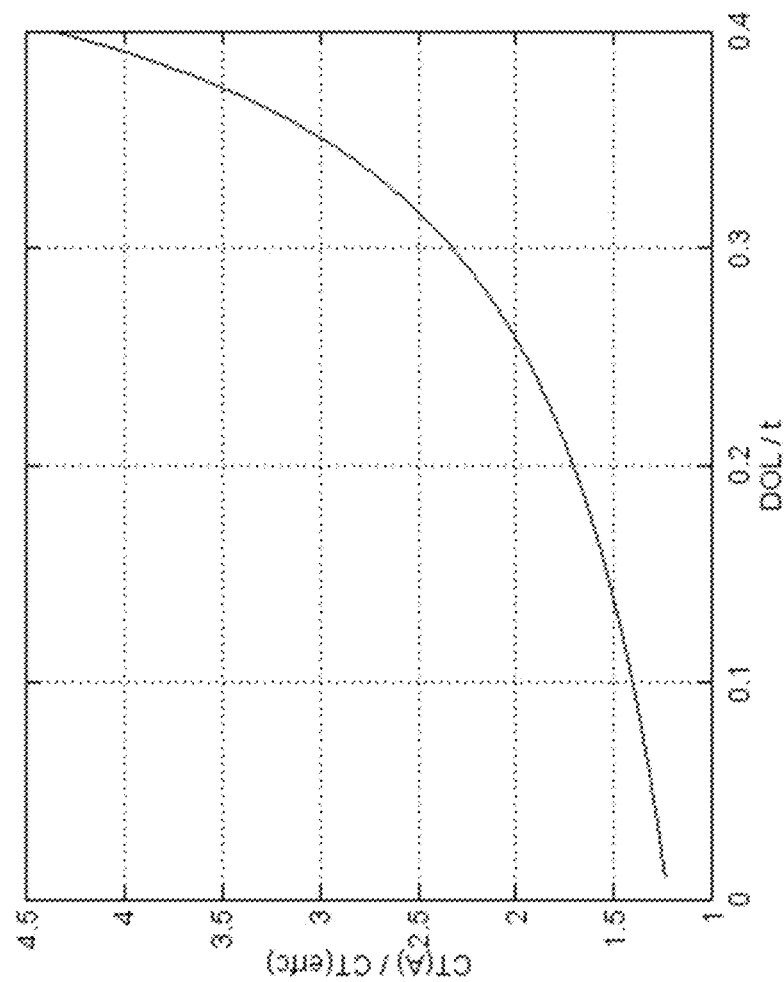
FIG. 2 is a plot of the ratio of the approximate adopted $CT_A$ and the calculated physical central tension CT (CT (erfc)) for the error function (erfc) profile characteristic of linear diffusion.

The ratio of the approximate adopted $CT_A$ and the calculated true physical CT (CT(erfc)) for the erfc profile characteristic of linear diffusion is shown in FIG. 2 as a function of the ratio of the depth of layer DOL, where DOL is calculated by the FSM-6000 for the same erfc-shaped index profile, with the FSM-6000 considering it as a linear truncated profile to the thickness of the layer.

If the concentration profile of the chemically strengthening ion follows the functional form in the linear-diffusion case:

$$C(x) = C_0 \operatorname{erfc}\left(\frac{x}{x_0}\right), \quad (9)$$

where $x_0$ is an effective penetration depth, it relates to the FSM-measured DOL by the equation $$DOL = 1.3825 x_0 \quad (10).$$

The CT is then determined from CS from force balance:

$$\int_0^{DOC} \sigma \, dx = \int_{DOC}^{\frac{t}{2}} \sigma \, dx. \quad (11)$$

The ratio of the physical CT to the CS then depends on the DOL in the following way:

$$\frac{CT}{CS} = \frac{\frac{2DOL}{1.3825t\sqrt{\pi}}\left(1 - e^{-\frac{1.3825^2 t^2}{4DOL^2}}\right)}{\frac{2DOL}{1.3825t\sqrt{\pi}}\left(1 - e^{-\frac{1.3825^2 t^2}{4DOL^2}}\right) + \operatorname{erfc}\left(\frac{1.3825t}{2DOL}\right) - 1}. \quad (12)$$

On the other hand, the FSM formula for $CT_A$ is $$CT_A = \frac{CS \times DOL}{t - 2DOL}, \quad (13)$$

and the ratio of the traditionally adopted approximate $CT_A$ to the physical CT for the linear-diffusion case (erfc-profile) is Therefore:

$$\frac{CT_A}{CT} = \frac{1}{1 - \frac{2DOL}{t}} \cdot \frac{\frac{DOL}{0.69t\sqrt{\pi}}\left(1 - e^{-\frac{0.478 t^2}{DOL^2}}\right) + \operatorname{erfc}\left(\frac{0.69t}{DOL}\right) - 1}{0.816\left(1 - e^{-\frac{0.478 t^2}{DOL^2}}\right)}. \quad (14)$$

Frangibility limit $CT_1$ in terms of $CT_A$, and the corresponding physical CT limit are calculated from $CT_1$ assuming the DOL is 0.03, 0.04, and 0.05 mm as commonly measured by the surface stress meter FSM-6000. For the range of thicknesses >0.3 mm, and ion exchange for the glass composition described in US Barefoot I in nominally pure $KNO_3$, the CS is between about 700 and 900 MPa, and the DOL is greater than about 0.03 mm at the onset of frangibility. In terms of $CT_A$ the region above the $CT_1$ curve is frangible according to the prior art. This means that in terms of physical CT the entire region above the continuous line representing $CT_{erfc}$ for DOL=0.03 mm, is considered frangible according to the prior art.

Figure 3:
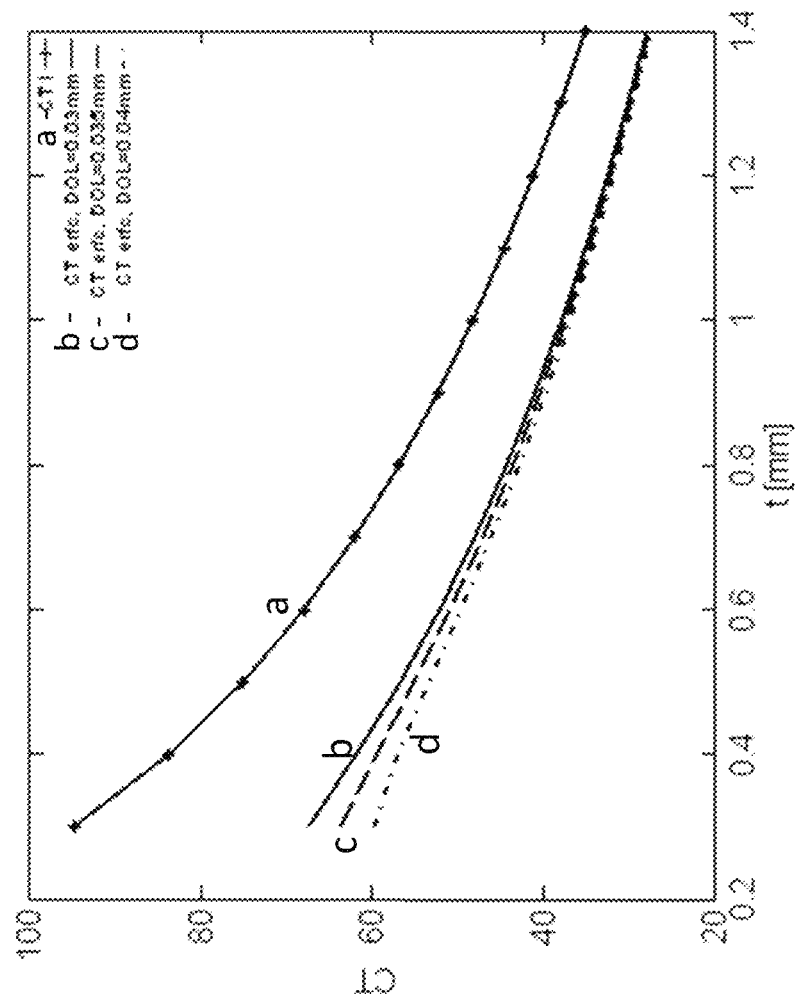
FIG. 3 is a plot of the frangibility limit CT in terms of $CT_1$.

The boundary separating the regions of frangible and non-frangible glass in the two-dimensional space of thickness and CT are shown in FIG. 3. FIG. 3 includes the separating line defined in terms of $CT_A$ according to Barefoot II ((a) in FIG. 3) and three other lines expressed in terms of physical CT and calculated for erfc-shaped profiles having the same $CT_A$ as Barefoot I are shown. These lines were calculated for different DOLs measured using the FSM-6000 stress meter and represent the range of typical DOLs for which frangibility occurs in the glass disclosed by Barefoot II following ion exchange in nominally pure $KNO_3$. Of these, the highest CT limit representing the $CT_A$ curve in terms of physical CT is the one corresponding to the smallest DOL (0.03 mm; line b in FIG. 3).

For thicknesses greater than 0.75 mm, the space above the curves represents conditions for frangible glass in terms of $CT_A$ or physical CT, depending on the curve.

Figure 4:
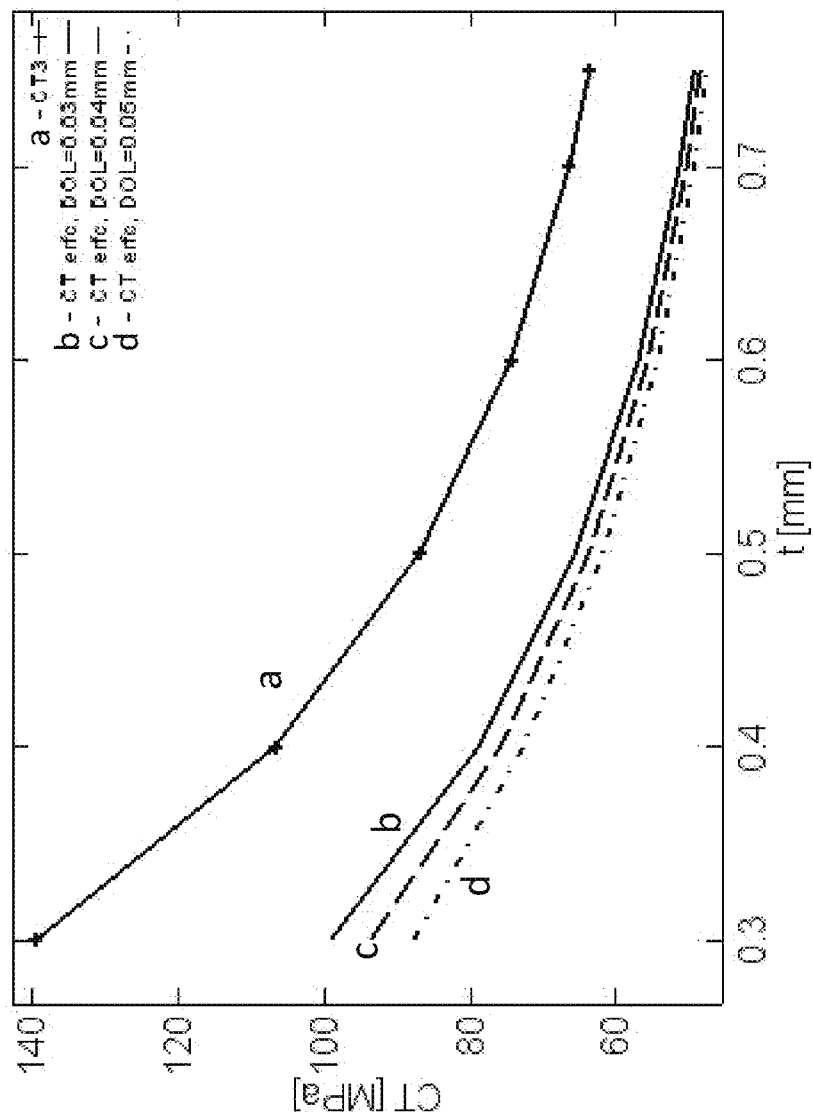
FIG. 4 is a plot of the frangibility limit CT in terms of $CT_3$.

The boundary separating the regions of frangible and non-frangible glass in the two-dimensional space of thickness and CT after ion exchange in nominally pure $KNO_3$, based on the criterion expressed by $CT_3$, is shown in FIG. 4. FIG. 4 includes the separating line defined in terms of $CT_A$ ((a) in FIG. 3) as well as three other erfc-shaped profiles expressed in terms of physical CT. These profiles have the same $CT_A$ as the line a, and were calculated for different DOLs as measured by FSM-6000. These profiles represent the range of typical DOLs for which frangibility occurs in the glass disclosed in Barefoot II. Of the lines shown in FIG. 4, the highest physical CT limit representing the $CT_A$ curve in terms of physical CT is the one corresponding to the smallest DOL.

Since frangibility for pure $KNO_3$ ion exchange bath and thickness t>0.3 mm occurs generally at DOL>0.03 mm, the entire region above the curve in FIG. 4 corresponding to DOL=0.03 mm (curve b) is a region of frangibility according to Barefoot I.

The particular glass composition used for demonstrating the embodiments of the present disclosure is described in U.S. patent application Ser. No. 13/678,013 by Timothy M. Gross, entitled "Ion Exchangeable Glass with High Crack Initiation Threshold," filed Nov. 15, 2012, and U.S. Pat. No. 8,765,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. This glass contained $Na_2O$ as the dominant alkali oxide with a negligible amount of $K_2O$ in the base substrate, as a result of imperfect elimination of $K_2O$ from the starting raw materials. In this case, substantially nonlinear diffusion occurs during the ion exchange of $K^+$ for $Na^+$, where the mutual diffusion coefficient is low in regions with low $K^+$ concentrations, and is substantially higher in those regions where the $K^+$ concentration is a large fraction (>25%) of the total concentration of $K^+$ and $Na^+$. In such instances, the shape of the error (erfc) function does not accurately represent the shape of the index and stress profiles, and a detailed nonlinear diffusion model is necessary to accurately describe the profiles and their relationship to ion-exchange conditions. Detailed stress profile extraction using an IWKB-based algorithm described in Roussev I (U.S. patent application Ser. No. 13/463,322, previously cited hereinabove. Examples of non-erfc extracted index profiles of an actual substrate are shown FIG. 5, which is a plot of transverse magnetic (TM) and transverse electric (TE) index profiles extracted by the IWKB-based algorithm up to the turning point of the last captured optical mode via prism coupling measurements. The glass substrate was a 0.4-mm-thick glass that was ion exchanged 17.7 hours at 440° C. in a bath containing 50% $NaNO_3$ and 50% $KNO_3$ by weight. The glass substrate composition is described in U.S. patent application Ser. No. 13/678,013. The shapes of the index profiles differ substantially from the erfc-shape. FIG. 6 is a plot of a stress profile for a 0.4 mm-thick glass that was exchanged 17.7 hours at 440° C. in a bath containing 50% $NaNO_3$ and 50% $KNO_3$ by weight. The composition of the glass sample is described in U.S. patent application Ser. No. 13/678,013. The stress profile has a compressive stress at the surface (depth=0 μm) of 219 MPa, a depth of compression DOC of 78 μm, and a central tension CT of 86 MPa. This physical CT is substantially higher than the physical CT limit of 62 MPa, as taught by Barefoot I, for a glass having a thickness of 0.4 mm. The difference CT–CS is about 86 MPa–(–219 MPa)=305 MPa.

The elastic energy per unit area, integrated along the depth dimension, is estimated to be about 13.4 J/m² in the compression region, and about 15.7 J/m² in the tension region. Hence, the total elastic energy is approximately 29.1 J/m². Considering the thickness of 0.4 mm, the total elastic energy per unit thickness is 72.8 J/(m²·mm).

Figure 7:
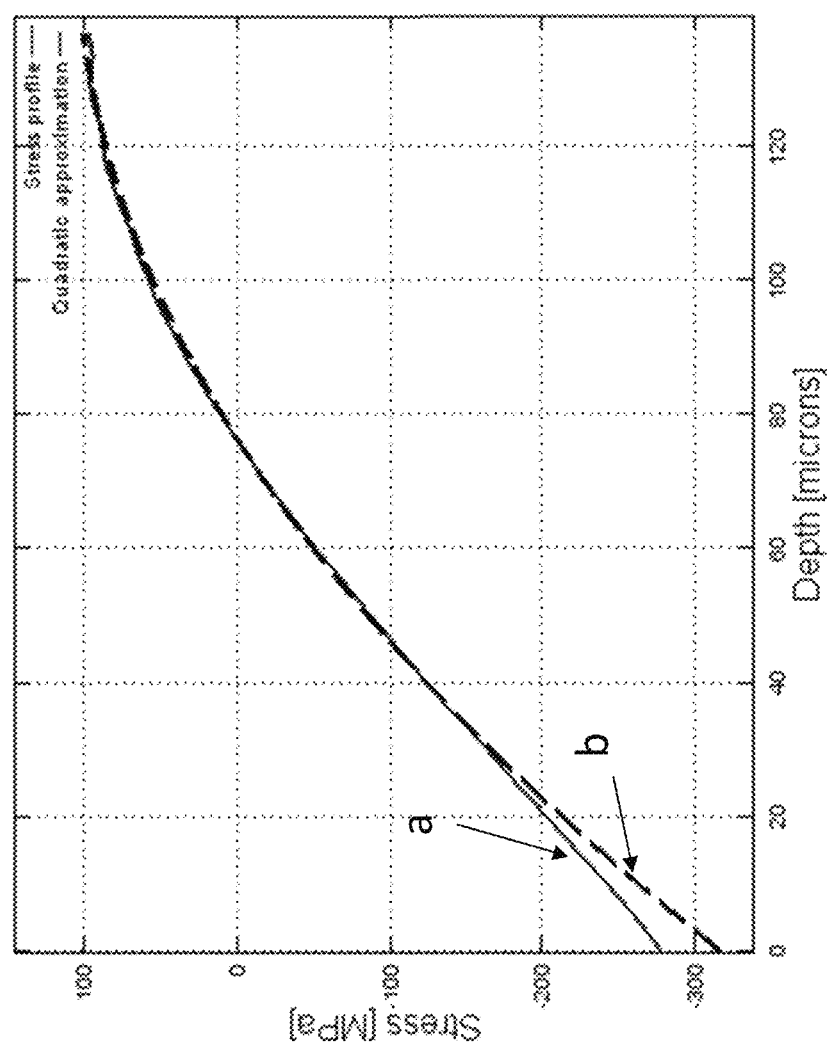
FIG. 7 is a plot of an example of the stress profile extracted using the IWKB method.

By applying the condition of force balance between the depth integral of the stress over the compression region and the depth integral of the stress over the tension region, the value of the actual physical central tension CT can accurately be determined. This physical CT should generally correspond to the erfc-based physical CT that may be calculated in the essentially linear-diffusion case previously mentioned. The stress profile found by the IWKB method is usually limited to the depth of the smaller of the deepest turning points for the TM and TE optical modes of the waveguide region. When the DOL is very large, the stress profile at depths approaching these largest depths is sometimes subject to significant noise. Hence, a parabolic approximation for the shape of the stress profile between the depth of compression DOC is employed, and the larger depth at which the profile becomes essentially flat at the depth of chemical penetration, having stress substantially equal to the central tension from that depth to the center of the substrate. An example of the stress profile extracted using the IWKB method is shown in FIG. 7. The solid line (line a) in FIG. 7 represents the quadratic approximation adopted to emulate the profile shape in the tension zone for accurate estimate of the stress integral in the tension zone. The variable part of the stress profile in the tension zone is represented by a parabola (dashed line (b) in FIG. 7) extending between the depth of compression (DOC) and the depth equal to 1.15·DOL. For the particular glass described hereinabove, the depth of profile flattening is approximately 1.15·DOL, where DOL is determined by the FSM-6000 instrument for the same ion exchanged glass. In those cases where the stress profile could be extracted with very low noise, the deepest portion of the stress profile has a stress that approaches the central tension found by the above method of force balance between tension and compression forces. The force balance condition represents the fact that, in the absence of external forces, the sample shape remains unchanged in time.

Figure 5:
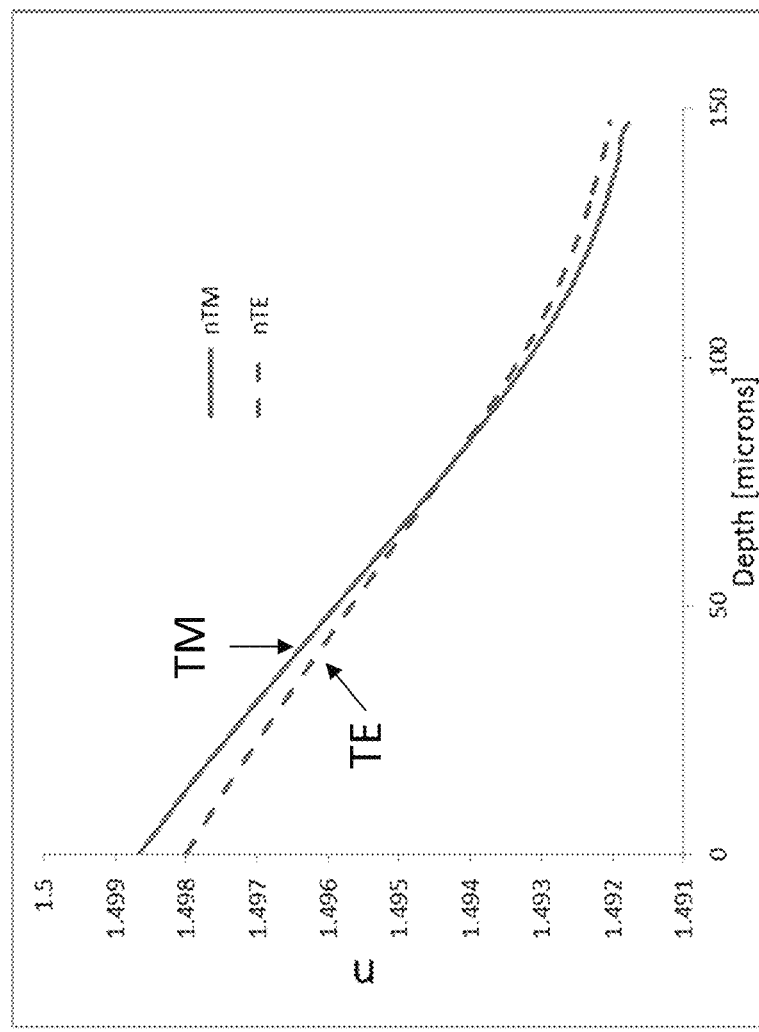
FIG. 5 is a plot of transverse magnetic (TM) and transverse electric (TE) index profiles extracted by the IWKB-based algorithm via prism coupling measurements.
Figure 6:
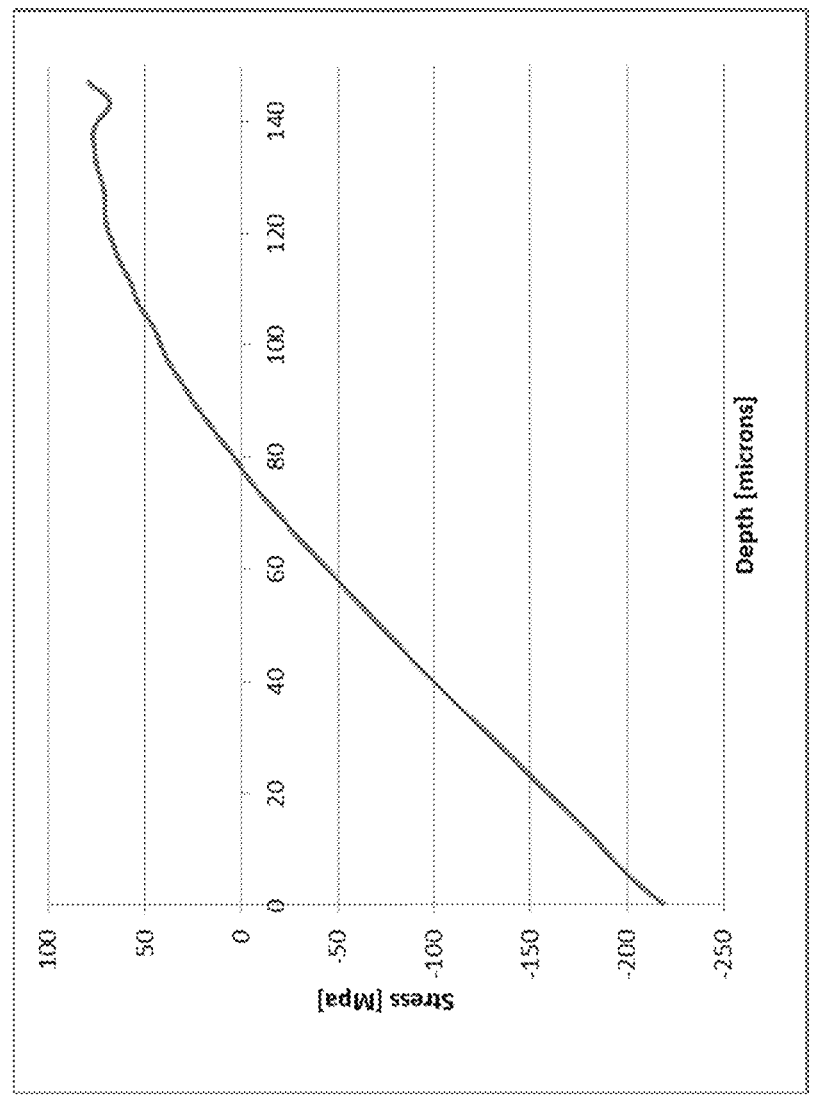
FIG. 6 is a plot of a stress profile for a 0.4 mm thick glass that was exchanged 17.7 hours at 440° C. in a bath containing 50% $NaNO_3$ and 50% $KNO_3$ by weight.

For the particular example shown in FIGS. 4 and 5, the difference CT–CS is about 305 MPa where, according to accepted physics conventions, tensile stress is positive and compressive stress negative. Frangibility did not occur during the ion exchange of glass having a thickness of 0.4 mm in a bath containing 50 wt % $NaNO_3$ and 50 wt % $KNO_3$, even when ion exchange times exceeded 30 hours and the stress profiles (at a level where the signal of the stress measurement is approximately equal to the noise level) from the two sides of the substrate closely approached the center of the sample.

In the absence of stress relaxation during and post ion exchange, the concentration difference CT–CS=|CT|+|CS| between the maximum concentration of the diffusant ($K^+$) and its minimum concentration in the center, is directly associated with the composition of the ion exchange bath and the ion exchange temperature. This difference remains largely independent of ion exchange time, until eventually the profiles from the two ends of the substrate meet in the middle and a measurable increase of the diffusant ($K^+$, or $K_2O$) concentration occurs in the center. At that point the concentration difference between the maximum concentration and the minimum concentration is reduced, and the difference CT–CS thus starts to decrease beyond that point even in the absence of stress relaxation. At temperatures below 450° C. and ion exchange salt mixture compositions in which $NaNO_3$ comprises at least 30 wt % in the $NaNO_3$+$KNO_3$ ion exchange bath, stress relaxation is relatively small. In addition, the difference CT–CS decreases very slowly with increasing ion exchange time and FSM DOL (due to the small stress relaxation) and may therefore be approximated as being constant. Hence, it has been found that for CT–CS≤305 MPa, the ion exchanged substrate does not become frangible even if the physical CT substantially surpasses any CT corresponding to previously disclosed CT limits, and the substrate may in fact never become frangible as long as the above inequality is observed. This case is valid for all substrate thicknesses greater or equal to the 0.4 mm thickness described herein.

In addition, no frangibility was observed for substrates that were ion exchanged for up to about 42 hours at 440° C. in a mixture containing 45 wt % NaNO$_3$ and 55 wt % KNO$_3$ and having CT–CS differences, depending on sample thickness, ranging approximately from about 311 MPa to about 324 MPa.

In one aspect, strengthened glass having a physical CT above the previously known frangibility CT limit (curve a in FIG. 3), DOL>0.1t, and CT–CS of less than or equal to about 350 MPa and, in some embodiments, less than or equal to about 340 MPa, does not exhibit frangible behavior regardless of the depth of layer. Accounting for moderate amounts of stress relaxation, the CT–CS difference at short ion exchange times (i.e., 10 µm≤DOL$_{short}$≤40 µm). When applying the convention normally used in the art (i.e., compression is expressed as a negative (<0) stress and tension is expressed as a positive (>0) stress), the CT–CS difference may be alternatively expressed as |CT|+|CS|≤350 MPa.

In another aspect, a regime where the onset of frangibility may be limited not by achieving a CT required to propagate a flaw quickly through the tensile central region of the glass can be obtained, but rather by the amount of stored elastic energy when the DOL is large, generally DOL>0.1t. In particular, conditions could be obtained where the CT may exceed the previously disclosed frangibility CT limit when the DOL is greater than about 0.15t. If the amount of stored elastic energy in the compression and tension regions is not adequate for the formation of large, new, free surfaces during crack propagation and bifurcation, then frangibility is prevented.

The elastic energy stored by the stress profile is calculated according to the equation $$W_{el} = \frac{(1-v)}{E} \int \sigma^2 dx, \quad (15)$$

where ν is the Poisson ratio (0.22 for the exemplary glass composition described hereinabove), E is Young's modulus (about 68 GPa for our example glass 5318), and σ is the stress.

The elastic energy per unit area of glass in each compression region (one on each major outer surface of the substrate) is:

$$W_{el}^{comp} = \frac{1-v}{E} \int_0^{DOC} \sigma^2 dx. \quad (16)$$

The elastic energy in the tension region from the compression depth to the center of the glass substrate is:

$$W_{el}^{tens} = \frac{1-v}{E} \int_{DOC}^{0.5t} \sigma^2 dxW. \quad (17)$$

The total elastic energy stored in the substrate is twice the sum of the elastic energy of a single compression and the tension region, multiplied by 2 to account for two compression regions region and one half of the central tension region occurring in a chemically strengthened substrate. The units for the different variables in the above equations are as follow:

for stress: [σ]=MPa≡10$^6$ N/m$^2$ (18);

for depth: [x]=µm=10$^{-6}$ m (19);

for elastic energy per unit substrate area:

$$[W_{el}] = \text{MPa}^{-1} * \text{MPa} * 10^6 \frac{N}{m^2} * 10^{-6} m \equiv \frac{N*m}{m^2} \equiv \frac{J}{m^2} \equiv \frac{\mu J}{mm^2}; \quad (20)$$

and
for elastic energy per unit substrate area per unit thickness: J/m$^2$·mm.

Using the quadratic approximation for the variable portion of the stress in the tension region, with a chemical depth $d_{chem}$=1.15·DOL$_{FSM}$, application of the force-balance condition results in the following specific equation for determining the physical CT for the particular glass composition and profiles considered:

$$F = \int_0^{DOC} \sigma(x) dx \quad (21)$$

which is found by integrating the stress over the compression region of the profile as extracted by the IWKB-based algorithm $$CT = \frac{F}{0.5t - \frac{2}{3}DOC - \frac{1}{3}d_{chem}}. \quad (22)$$

The energy in the compression region is found directly by integrating the square of the stress, through the definition equation for energy in the compression region (equation 7) previously described. The expression for the energy in the tension region that is valid in the specific case with the quadratic approximation for the variable portion of the profile in the tension zone is:

$$W_{el}^{tens} = \frac{1-v}{E} CT^2 \left( 0.5t - d_{chem} + \frac{8}{15}(d_{chem} - DOC) \right). \quad (23)$$

Results obtained for glasses having thicknesses ranging from 0.4 mm to 1.0 mm are summarized in Tables 3 and 3a. Table 3 lists the compressive stress CS determined by the IWKB method, depth of layer DOL estimated from the TM and TE spectra obtained using the FSM6000 stress meter, the thickness, the depth of compression, and the physical center tension CT. Table 3a lists the compressive energy ("Compr" in Table 3a), tensile energy, total energy, CT$_A$ and CT-CS values, and results of frangibility testing. The glasses listed in Tables 3 and 3a were ion exchanged at 440° C. for various times in a bath containing about 45 wt % NaNO$_3$ and about 55 wt % KNO$_3$. In these examples the DOL determined by the FSM-6000 ranges from about 0.14t to about 0.39t. As previously mentioned, the CT–CS difference ranges from about 311 MPa to at least 324 MPa. Depending on the thickness and DOL, the CS ranges from about 222 MPa to about 270 MPa. All glass samples listed in Table 3 were found to be non-frangible. For all thicknesses, the physical CT exceeded the physical CT frangibility limit corresponding to prior art limits, and CT$_A$ exceeded the prior-art CT$_A$ limit.

TABLE 3

Examples of non-frangible ion exchanged glass with DOL >0.1 t.

| CS IWKB | DOL FSM TM (est.) | DOL FSM TE (est.) | t mm | DOC μm | CT phys. MPa |
|---|---|---|---|---|---|
| 21 | −221.6 | 151.1 | 157.8 | 0.4 | 81.6 | 102.7 |
| 25.25 | −236.4 | 153.7 | 149.7 | 0.5 | 91.6 | 79.6 |
| 25.25 | −247.5 | 151.5 | 155.6 | 0.6 | 98.6 | 65.6 |
| 25.25 | −268.1 | 153.1 | 152.5 | 0.8 | 107.2 | 49.0 |
| 30 | −261.7 | 169.9 | 170.1 | 0.8 | 116.2 | 53.7 |
| 36 | −254.5 | 172.9 | 164.6 | 0.8 | 120.6 | 56.1 |
| 42 | −250.4 | 185.5 | 185.8 | 0.8 | 127.6 | 60.8 |
| 25.25 | −285.2 | 142.7 | 148.8 | 1.0 | 114.8 | 39.3 |
| 30 | −270.2 | 165.0 | 162.2 | 1.0 | 124.0 | 42.5 |
| 36 | −270.2 | 166.1 | 172.1 | 1.0 | 128.0 | 44.9 |
| 42 | −264.3 | 182.1 | 182.3 | 1.0 | 135.8 | 48.4 |

TABLE 3a

Examples of non-frangible ion exchanged glass with DOL >0.1 t.

| | Compr Energy [J/m²] | Tension Energy [J/m²] | Total Energy [J/m²] | Total Energy/t [J/m²mm] | $CT_A$ | CT-CS | Frangibility |
|---|---|---|---|---|---|---|---|
| 21 | 15.1 | 8.9 | 48.0 | 120.0 | 375.0 | 324.3 | NF |
| 25.25 | 18.7 | 8.7 | 54.8 | 109.7 | 183.1 | 316.0 | NF |
| 25.25 | 21.5 | 8.1 | 59.4 | 98.9 | 130.3 | 313.0 | NF |
| 25.25 | 26.7 | 7.2 | 67.7 | 84.6 | 83.5 | 317.1 | NF |
| 30 | 26.6 | 8.2 | 69.6 | 86.9 | 96.2 | 315.4 | NF |
| 36 | 27.1 | 8.9 | 71.9 | 89.9 | 93.3 | 310.6 | NF |
| 42 | 27.5 | 9.8 | 74.7 | 93.4 | 108.7 | 311.2 | NF |
| 25.25 | 30.3 | 6.4 | 73.4 | 73.4 | 58.6 | 324.5 | NF |
| 30 | 30.2 | 7.2 | 74.7 | 74.7 | 66.4 | 312.7 | NF |
| 36 | 31.4 | 7.9 | 78.6 | 78.6 | 69.7 | 315.1 | NF |
| 42 | 32.0 | 8.8 | 81.7 | 81.7 | 76.2 | 312.7 | NF |

Following ion exchange at 440° C. for 21 hours in a bath containing about 45 wt % NaNO₃ and about 55 wt % KNO₃ the sample having a thickness of 0.4 mm exhibited a depth of compression DOC of 81.6 μm, physical CT of at least 102.7 MPa, stored elastic energy in the compression region of 15.1 J/m², and stored elastic energy in half of the tension region of at least 8.9 J/m². The total elastic energy is at least 48 J/m² which, when normalized to thickness, is at least 120 J/m²·mm. In this embodiment, a new non-frangible region where the DOL is greater than about 0.1t has been found for the thickness of 0.4 mm. The physical CT is greater than the approximately 63 MPa value consistent with previous disclosures. The physical CT is greater than the 76 MPa value, which is consistent with $CT_A=CT_3=106.6$ MPa for 0.4 mm sample thicknesses of Barefoot I and Barefoot II.

In another example, a 0.4 mm thick sample ion exchanged for 26.5 hours at 440° C. in a bath comprising about 50 wt % NaNO₃ and 50 wt % KNO₃ had a CS of about 191 MPa, a CT of at least 94 MPa, and a DOC of about 85 μm and was found to be non-frangible. The physical CT was substantially higher than the physical value of 76 MPa, which corresponds to the previously disclosed value $CT_A=CT_3=106.6$ MPa for the same thickness.

Tables 4 and 4a list examples of non-frangible and frangible ion exchanged glass samples with DOL>0.1t and having thicknesses ranging from 0.4 mm to 0.8 mm. Each of the samples was ion exchanged at 440° C. in a bath containing about 40 wt % NaNO₃ and 60 wt % KNO₃. Table 4 lists the ion exchange time, compressive stress CS determined by the IWKB method, depth of layer DOL estimated from the TM and TE spectra obtained using the FSM6000 stress meter, sample thickness, the depth of compression, and the physical center tension CT. Table 4a lists the ion exchange time, compressive energy ("Compr" in Table 4a), tensile energy, total energy, $CT_A$ and CT-CS values, and results of frangibility testing ("F" denotes frangible behavior, and "NF" denotes non-frangible behavior). Samples that were ion exchanged for 42.6 hours have a FSM-style depth of layer DOL substantially greater than 150 μm, and some of the high-order modes may not have been detected due to difficulty resolving these densely spaced modes. Hence, the calculated values of DOL, physical CT, tension energy, and total elastic energy represent lower-limit estimates of actual values. Non-frangible examples exhibit CT−CS values of up to 334 MPa. In the three non-frangible examples, the physical CT substantially exceeds previously reported corresponding CT limits for the thicknesses of 0.6 mm (CT<52 MPa), 0.8 mm (CT<44.3 MPa), and 1.0 mm (CT<38 MPa). Respectively.

TABLE 4

Examples of non-frangible and frangible glass with DOL >0.1 t and various thicknesses, after ion exchange in a bath containing about 40 wt % NaNO₃ and 60 wt % KNO₃ at 440° C.

| Ion exchange time (hours) | CS (MPa) IWKB | DOL (μm) FSM TM est. | DOL (μm) FSM TE est. | t [mm] | DOC (MPa) | CT phis (MPa) |
|---|---|---|---|---|---|---|
| 21.5 | −227.9 | 154.8 | 158.3 | 0.4 | 84.6 | 115.5 |
| 25.7 | −255.0 | 146.7 | 153.4 | 0.6 | 100.2 | 70.2 |
| 25.5 | −281.4 | 143.5 | 150.0 | 0.8 | 109.0 | 52.5 |
| 42.6 | −272.2 | 185.0 | 183.9 | 1.0 | 139.0 | 52.8 |

TABLE 4a

Ion exchange times, compressive energy, tensile energy, total energy, $CT_A$ and CT-CS values, and results of frangibility testing for the samples listed in Table 4.

| IX time at 440 C. in 40 wt % NaNO₃ 60 wt % KNO₃ | Compr Energy [J/m²] | Tension Energy [J/m²] | Total Energy [J/m²] | Total Energy/t [J/m²mm] | $CT_A$ (MPa) | CT-CS (MPa) | Frangibility |
|---|---|---|---|---|---|---|---|
| 21.5 | 17.2 | 10.9 | 56.2 | 140.4 | 415.9 | 343.4 | F |
| 25.7 | 24.2 | 9.4 | 67.3 | 112.1 | 129.8 | 325.2 | NF |
| 25.5 | 30.2 | 8.3 | 77.1 | 96.4 | 82.2 | 333.9 | NF |
| 42.6 | 36.9 | 10.4 | 94.6 | 94.6 | 80.2 | 325.0 | NF |

In another example, listed in Tables 4 and 4a, a 0.4 mm thick glass sample ion exchanged for 21.5 hours was found to be frangible, having a total stored elastic energy of about 56.2 J/m² which, when normalized to thickness, equaled about 140.4 J/m² mm. Hence, the newly discovered non-frangible region described herein is characterized as having stored elastic energy of less than 56.2 J/mm² for a 0.4 mm glass sample thickness, and the elastic energy normalized to thickness is less than 140.4 J/m² mm for all thicknesses, particularly for thicknesses greater than or equal to 0.4 mm.

In another example, listed in Tables 3 and 3a, a 0.5 mm thick glass sample ion exchanged for 25.25 hours was found to be non-frangible glass with CT of 9.6 MPa. This CT is significantly greater than the value of about 56 MPa reported by Barefoot I for a 0.5 mm sample thickness and 0.04 mm DOL. The $CT_A$ of this sample listed was estimated to be 183 MPa, which is much greater than $CT_3$ (0.5 mm) of 86.9 MPa. The DOC of the sample was as high as 91.6 μm, the energy in the compression region was 18.7 J/m², and the energy in the tension half-region was at least 8.7 J/m². The total stored elastic energy was at least 54.8 J/m² which, when normalized to the thickness, was at least 109.7 J/m²·mm. The CT−CS difference was about 316 MPa.

A 0.6 mm thick sample listed in Tables 3 and 3a was ion exchanged at for 25.25 hours and found to be non-frangible. The ion exchanged sample had a CS of about 248 MPa, a DOL of about 153 μm, a DOC of 98.6 μm, and a physical CT of at least 65.6 MPa, the latter being substantially above the limit of about 51 MPa reported by Barefoot I in terms of physical CT for DOL of about 40 μm. The $CT_A$ was estimated to be 130 MPa, which is substantially greater than the previously reported $CT_3$ of 75.5 MPa. The estimated elastic energy in the compression region was 21.5 J/m², and in the tension region it was approximately 8.1 J/m². The total elastic energy was about 59.4 J/m², and elastic energy per unit area and unit thickness was about 98.9 J/m² mm.

A 0.6 mm thick sample listed in Tables 4 and 4a was ion exchanged for 25.7 hours and found to be non-frangible. The ion exchanged sample had a CS of about 255 MPa, a DOL of about 150 μm, a DOC of 100 μm, and even higher physical CT of about 70.2 MPa, which was substantially higher than the previously reported value of about 56 MPa. Similarly, the non-frangible sample exhibited $CT_A$ of 129.8 MPa, which is substantially greater than the previously reported frangibility limit $CT_A=CT_3$ (0.6 mm)=74.5 MPa. The elastic energy in the compression region was about 24.2 J/m², and at least 39.4 J/m² in the tension half-region. The total elastic energy was estimated to be at least 67.3 J/m², and the elastic energy per unit area and unit thickness was at least 112 J/m² mm.

A sample having a thickness of 0.8 mm (Tables 3 and 3a) was ion exchanged for 25.25 hours and found to be non-frangible with CS of about 268 MPa, a DOL of about 153 microns, a DOC of about 107 μm, a and physical CT of about 49 MPa. The physical CT is higher than the 43.5 MPa frangibility limit in terms of physical CT corresponding to corresponding to $CT_A=CT_1$ for a thickness of 0.8 mm. The elastic energy in the compression region was 26.7 J/m², while the tension half-region had an elastic energy of 7.2 J/m² in. The total elastic energy was about 67.7 J/m² which, when normalized to thickness, is about 84.6 J/m² mm.

Another sample having a thickness of 0.8 mm and listed in Tables 4 and 4a exhibited non-frangible behavior following ion exchange for 25.5 hours. The sample had a CS of about 281 MPa, a DOL of about 146 μm, a DOC of about 109 μm, and a physical CT of about 45 MPa, the latter being substantially greater than the prior-art limit in terms of physical CT (43.5 MPa) for a thickness of 0.8 mm. The elastic energy was about 30.2 J/m² in the compression region, and about 10.6 J/m² in the tension half-region, resulting in a total of about 77.1 J/m². The elastic energy density, i.e., the elastic energy per unit area and unit thickness, was about 96.4 J/m² mm. The difference CT−CS of this non-frangible glass was at least about 334 MPa.

Four examples of deep ion exchange of 1 mm thick glass substrates are listed in Tables 3 and 3a. Ion exchange was carried out at 440° C. on these samples for 25.25, 30, 36, and 42 hours. The resulting physical CT values were estimated to be 39.3 MPa, 42.5 MPa, at least 44.9 MPa, and 48.4 MPa, respectively. The values may be underestimated, particularly for the 36 hour ion exchange, due to the DOL exceeding 160 μm, which presents challenges for precise resolution of the high-order modes. The $CT_A$ values ranged from about 58.6 to about 76.2 MPa, and were all substantially above the prior-art limit $CT_1$=48.2 MPa. The DOL ranged from about 143 μm to over 170 μm, while the DOC ranged from about 115 μm to about 136 μm. The difference CT−CS ranged from about 313 MPa to about 325 MPa. The total stored elastic energy ranged from about 73.4 81.7 J/m² to at least about 81.7 J/m² and the average energy density was 81.7 J/(m²·mm).

A sample having a thickness of 1.0 mm, listed in Tables 4 and 4a, was ion exchanged for 42.6 hours. The resulting strengthened glass was non-frangible, with CS of about 272 MPa, and a physical CT of at least about 52.8 MPa, which was substantially above the physical CT frangibility limit estimate of 37 MPa for 1 mm thick glass with DOL of about 50 μm. The $CT_A$ of the non-frangible samples was about 80.2 MPa, which is substantially higher than the Barefoot I frangibility limit of $CT_A=CT_1$ (1 mm)=48.2 MPa. The DOL was estimated to be about 185 μm or greater, the DOC was about 139 μm, and the elastic energy was about 36.6 J/m² in the compression region and greater than about 10.4 J/m² in the tension half-region. The total elastic energy was at least 49.9 J/m², and represents an average elastic energy density of at least 49.9 J/m² mm.

Figure 8:
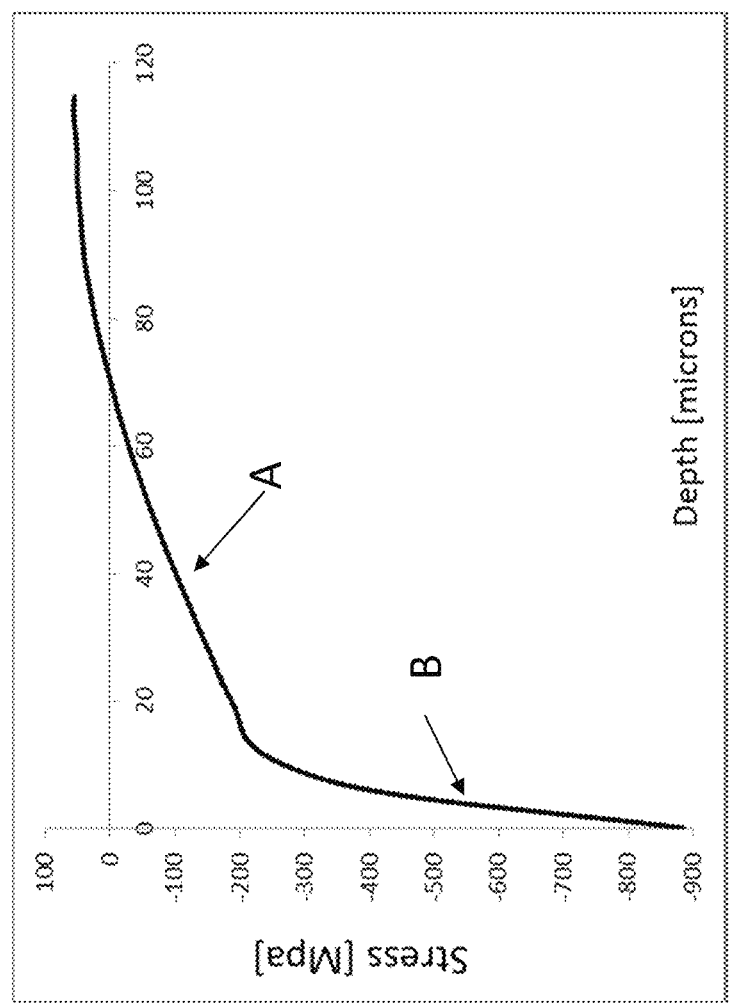
FIG. 8 is a plot of the stress profile for double-ion exchanged 0.55 mm-thick glass.

The examples summarized above demonstrate that, when the DOL accounts for an appreciable fraction of the glass thickness, the CT value at which frangibility occurs can vary with DOL, depending on the stored total elastic energy. The total elastic energy becomes even more significant in the case of double-ion-exchanged glass having a deep region of moderate compression and a shallow region of high compression in which the stress varies strongly with depth (FIGS. 7 and 8). The sample represented in FIGS. 7 and 8 was double-ion exchanged 0.55 mm thick glass. The first ion exchange step included ion exchange at 450° C. for 7.75 hours in a 40 wt % $NaNO_3$/60 wt % $KNO_3$ molten mixture. The first ion exchange step produced the deep, slowly-changing portion A of the stress profile. In the second step, the glass was ion exchanged at 390° C. for 12 minutes in a bath containing approximately 99.5 wt % $KNO_3$ and 0.5 wt % $NaNO_3$, and produced the shallow steep region B of the stress profile. Samples with this stress profile are unlikely to be frangible, although any significant even minor additional ion exchange to increase the depth of the first or second region would result in a frangible glass. The IWKB analysis revealed a CS of about 891 MPa, a DOC of about 70.6 microns, and a physical CT of about 61 MPa, which is similar to the frangibility limit of physical CT limit corresponding to $CT_A=CT_3$ (0.55 mm). The elastic energy was about 44.7 J/m² in the compression region, and about 7.8 MJ/m² in the tension half-region. The total elastic energy was about 105 J/m², representing an average energy density of about 191 J/m² mm. This is the highest average elastic energy density that has been observed in non-frangible samples having a large chemical penetration depth of greater than about 0.12t, and $CT_A$ substantially above the $CT_3$ prior-art frangibility limit.

As described herein, when the DOL accounts for an appreciable (i.e., 10%) fraction of the glass thickness, the value of CT at which frangibility occurs may vary with DOL, depending on the stored total elastic energy. The total elastic energy plays an even greater role in when the glass is strengthened by a two-step—or double—ion exchange process, in which the glass is provided with a deep region of moderate compression, and a shallow surface region of high compression where the stress varies with depth very quickly (FIG. 8). FIG. 8 is a plot of the stress profile for double-ion exchanged 0.55 mm-thick glass. The first step involved ion exchange for 7.75 hours at 450° C. in a molten mixture of 40 wt % $NaNO_3$ and 60 wt % $KNO_3$. The first step produced the deep slowly-changing portion (A) of the stress profile. In the second step, the glass was ion exchanged at 390° C. for 12 minutes in a bath containing approximately 99.5 wt % $KNO_3$ and 0.5 wt % $NaNO_3$, producing the shallow steep region (B) of the stress profile Samples having the stress profile shown in FIG. 8 were found to be non-frangible, although any significant additional ion exchange to increase the depth of the first or second region would result in frangible glass. The IWKB analysis of the glass revealed a CS of about 891 MPa, a DOC of about 70.6 μm, and a physical CT of about 61 MPa, the latter being substantially above the frangibility limit in terms of physical CT estimated based on previous guidelines for strengthened glasses having a thickness of 0.55 mm and a DOL of 40 μm.

The elastic energy of the sample shown in FIG. 6 was about 44.7 J/m² in the compression region, and about 9.5 MJ/m² in the region under tension. The total elastic energy was about 54.1 J/m², representing an average energy density of about 98.4 J/m²·mm. This is the highest average elastic energy density that has been observed in non-frangible samples. It is estimated that the maximum average elastic energy density for non-frangible glass over the thickness range from 0.4 mm to 1 mm lies between about 98 J/m² mm and 116.5 J/m²mm, the latter value being the lowest value where 0.4 mm-thick glass with large DOL was observed to be frangible.

In some embodiments, the elastic energy density is less than about 200 J/m²·mm. In other embodiments, the elastic energy density is less than about 140 J/m²·mm and, in still other embodiments, the elastic energy is less than about 120 J/m²·mm.

Figure 9:
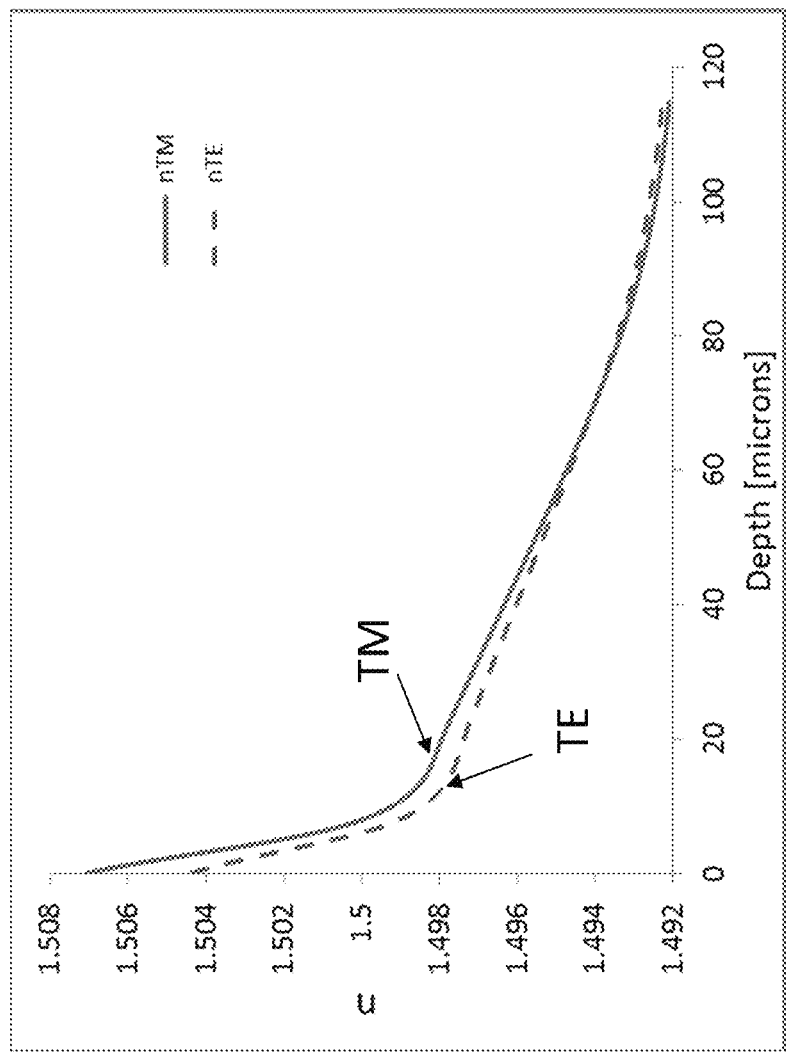
FIG. 9 is a plot of TE and TM index profiles of the double-ion-exchanged glass sample of FIG. 8.

FIG. 9 represents the TE and TM refractive index profiles for the sample whose stress profile is shown in FIG. 8. For the ion exchange of $K^+$ for $Na^+$, the refractive index increases as a result of the ion exchange, and the index profile is a monotonic function of depth, making it convenient to use IWKB analysis for the extraction and evaluation of stress profiles. The index profiles of FIG. 9 show that, other than approximating the surface compressive stress the DOL, the FSM-6000 will significantly under-estimate the chemical penetration depth for the deep region and will not provide direct information about the steep shallow region in the case of double-ion-exchange (DIOX) profiles. This is because the widely used DOL reported by FSM-6000 is calculated assuming that the index profile is well represented by a single linear segment having a single fixed slope and a single depth of penetration. The widely used $CT_A$ calculated based on the DOL obtained using the FSM-6000 and the surface CS is often 2 to 3 times greater than the physical CT for the DIOX profile, and is therefore not convenient to use as a predictor of frangibility. It should be clear that the analysis revealed in the present disclosure in terms of physical CT and stored elastic energy has a much broader realm of application than the $CT_A$—based criteria.

In addition, stress profiles having large compression depth in some cases can be obtained using ion exchange that does not lead to an increase of the refractive index, such as, for example, during the exchange of $Na^+$ for $Li^+$ in a glass substrate that is rich in $Li_2O$. While the traditionally used DOL based on measurement of the number of guided optical modes is not available in these cases, the compression depth DOC is still a physical quantity that can be measured by various polarimetry techniques and represent the depth of chemical strengthening. As can be seen in Tables 1 and 2 below, the DOC is greater than 0.1t, usually exceeds 0.12t, and most often exceeds 0.15t for all examples of non-frangible glass with physical CT exceeding the prior-art frangibility limit.

The criterion for non-frangibility that is based on the difference CT–CS regardless of DOL can be equivalently restated as the non-frangibility region for CT–CS<330 MPa when using a salt composition and temperature that allows CT–CS<350 MPa (or |CT|–|CS|≤350 MPa) to be achieved when 10 μm≤$DOL_{short}$≤40 μm. This permits an infinite increase of DOC without risk of frangibility. Similarly, the frangibility criterion that stored elastic energy should be less than about 233 J/m²·mm and, in some embodiments, less than about 197 J/m²·mm, can be applied to a wide variety of glasses having DOC>0.1t, including $Li_2O$-rich glasses that may have $Na^+$ for $Li^+$ ion exchange, and also $Na^+$ and $K^+$ for $Li^+$ ion exchange. In such instances, the criterion 10 μm $DOL_{short}$≤40 μm may be replaced with a criterion 10 μm≤$DOL_{short}$≤40 μm, as DOL may not be defined in FSM-6000 terms.

FIG. 9 is a plot of the TE and TM refractive index profiles for of the double-ion-exchanged 0.55 mm thick glass sample shown in FIG. 8. For the $K^+$ for $Na^+$ ion exchange, the refractive index increases as a result of the ion exchange. The index profile is a monotonic function of depth, making it convenient to use IWKB analysis for the extraction and evaluation of stress profiles. The index profiles of FIG. 9 show that, in the case of double-ion-exchange (DIOX) profiles, the DOL estimated by the FSM-6000 will significantly underestimate the chemical penetration depth for the deep region of the compressive layer and will not provide direct information about the steep shallow region, other than approximate estimate of the surface compressive stress. This is because the widely used DOL reported by FSM-6000 is calculated assuming that the index profile is well represented by a single linear segment having a single fixed slope and a single depth of penetration. The widely used $CT_A$ calculated based on that DOL and the surface CS is often a factor of two to three times greater than the physical CT for the DIOX profile, and is therefore not convenient to use as a predictor of frangibility. Thus, the analysis described in the present disclosure in terms of physical CT and stored elastic energy has a much broader realm of application than the $CT_A$-based criteria of the prior art. The $DOL_{FSM}$ depth of layer for the present DIOX example is 75 μm, and the $CT_A$ is about 167 MPa, which is more than twice the prior-art limit of $CT_A$=$CT_3$ (0.55)=80 MPa.

In some instances, stress profiles having large compression depth DOC may be obtained using ion exchange such as, for example, during exchange of $Na^+$ for $Li^+$ in a glass that is rich in $Li_2O$, that does not result in an increase of the.

DOL based on measurement of the number of guided optical modes is not available in these cases. However, the compression depth DOC is a physical quantity that represents the depth of chemical strengthening can be measured by various polarimetry and refractive near-field (RNF) techniques. As can be seen in Tables 3 and 4, the DOC is greater than 0.09t, usually exceeds 0.12t, and most often exceeds 0.15t for the smaller thicknesses (t is the thickness) for all non-frangible examples of glass with physical CT exceeding the prior-art frangibility limit.

The criterion for non-frangibility, regardless of DOL, that is based on the difference CT–CS can be equivalently restated as non-frangibility region for CT–CS<330 MPa, using a salt composition and temperature that may allow CT–CS values as high as 350 MPa when 10 µm≤$DOL_{short}$≤40 µm, thus allowing an infinite increase of DOC without risk of frangibility. Similarly, the frangibility criterion that stored elastic energy should be <233 J/m²·mm, and, in some embodiments, less than about 197 J/m²·mm can be applied to a wide variety of glasses having DOC>0.1t, including $Li_2O$ rich glasses that may have $Na^+$ for $Li^+$ ion exchange, and also $Na^+$ and $K^+$ for $Li^+$ ion exchange. In this case the criterion 10 µm≤$DOL_{short}$≤40 µm may be replaced with a criterion 10 µm≤$DOC_{short}$≤40 µm, as DOL may not be defined in terms of FSM-6000 data.

In another embodiment, a frangibility criterion in the form of a normalized total energy is provided. The normalized total energy is defined as:

$$W_{norm}^{tot} = \frac{W_{el}^{tot}}{\left(\frac{1-\nu}{E}\right)} = \int_0^{Thickness} \sigma^2 dx. \quad (24)$$

In many of the examples described above, when DOL>0.1t, particularly when the thickness is 0.4 mm, the fixed CT limit-based prediction of frangibility starts to become inaccurate. In these cases, the total normalized energy provides a better prediction of frangible behavior. While the total normalized energy values vary with the mechanical parameters of the glass substrate, namely, the Poisson ration ν and Young's modulus E, it is reasonable to assume that these values fall in a relatively compact range.

Therefore, in one embodiment, the ion exchanged glass article having a central tension CT above the limit $CT_3$ for thicknesses less than or equal to 0.75 mm, or above the limit $CT_1$ for thicknesses greater than 0.75 mm, has a total normalized elastic energy per unit thickness less than or equal to 37.5×10³ MPa²µm. For a thickness of 0.4 mm, a substrate having a $CT_A$ greater than 106.6 MPa should store a normalized elastic energy less than or equal to 15×10⁶ MPa²µm.

Depending on the glass composition and mechanical properties of the glass, the limits of the total normalized energy may change. However, these values fill the range of most of glasses of interest and encompass its practical limits where frangibility is avoided.

In another embodiment, the total normalized energy is less than 7.5×10⁶ MPa²µm for 0.4 mm thick substrates. For other thicknesses, the normalized stored elastic energy per unit thickness is less than about 19×10³ MPa²µm.

The glass articles described herein may comprise or consist of any glass that is chemically strengthened by ion exchange. In some embodiments, the glass is an alkali aluminosilicate glass.

In one embodiment, the alkali aluminosilicate glass comprises or consists essentially of: at least one of alumina and boron oxide, and at least one of an alkali metal oxide and an alkali earth metal oxide, wherein—15 mol % ($R_2O+R'O-Al_2O_3-ZrO_2$)–$B_2O_3$≤4 mol %, where R is one of Li, Na, K, Rb, and Cs, and R' is at least one of Mg, Ca, Sr, and Ba. In some embodiments, the alkali aluminosilicate glass comprises or consists essentially of: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. In some embodiments, the glass comprises alumina and boron oxide and at least one alkali metal oxide, wherein −15 mol %≤($R_2O+R'O-Al_2O_3-ZrO_2$)–$B_2O_3$≤4 mol %, where R is at least one of Li, Na, K, Rb, and Cs, and R' is at least one of Mg, Ca, Sr, and Ba; wherein 10≤$Al_2O_3+B_2O_3+ZrO_2$≤30 and 14≤$R_2O+R'O$≤25; wherein the silicate glass comprises or consists essentially of: 62-70 mol. % $SiO_2$; 0-18 mol % $Al_2O_3$; 0-10 mol % $B_2O_3$; 0-15 mol % $Li_2O$; 6-14 mol % $Na_2O$; 0-18 mol % $K_2O$; 0-17 mol % MgO; 0-18 mol % CaO; and 0-5 mol % $ZrO_2$. The glass is described in U.S. patent application Ser. No. 12/277,573 filed Nov. 25, 2008, by Matthew J. Dejneka et al., and entitled "Glasses Having Improved Toughness And Scratch Resistance," and U.S. Pat. No. 8,652,978 filed Aug. 17, 2012, by Matthew J. Dejneka et al., and entitled "Glasses Having Improved Toughness And Scratch Resistance," both claiming priority to U.S. Provisional Patent Application No. 61/004,677, filed on Nov. 29, 2008. The contents of all of the above are incorporated herein by reference in their entirety.

In another embodiment, the alkali aluminosilicate glass comprises or consists essentially of: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+CaO≤10 mol %. In some embodiments, the alkali aluminosilicate glass comprises or consists essentially of: 60-70 mol % $SiO_2$; 6-14 mol % $Al_2O_3$; 0-3 mol % $B_2O_3$; 0-1 mol % $Li_2O$; 8-18 mol % $Na_2O$; 0-5 mol % $K_2O$; 0-2.5 mol % CaO; above 0 to 3 mol % $ZrO_2$; 0-1 mol % $SnO_2$; and 0-1 mol % $CeO_2$, wherein 12 mol %<$Li_2O+Na_2O+K_2O$≤20 mol %, and wherein the silicate glass comprises less than 50 ppm $As_2O_3$. In some embodiments, the alkali aluminosilicate glass comprises or consists essentially of: 60-72 mol % $SiO_2$; 6-14 mol % $Al_2O_3$; 0-3 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol %≤$Li_2O+Na_2O+K_2O$≤20 mol %, and wherein the silicate glass comprises less than 50 ppm $As_2O_3$ and less than 50 ppm $Sb_2O_3$. The glass is described in U.S. Pat. No. 8,158,543 by Sinue Gomez et al., entitled "Fining Agents for Silicate Glasses," filed on Feb. 25, 2009; U.S. Pat. No. 8,431,502 by Sinue Gomez et al., entitled "Silicate Glasses Having Low Seed Concentration," filed Jun. 13, 2012; and U.S. Pat. No. 8,623,776, by Sinue Gomez et al., entitled "Silicate Glasses Having Low Seed Concentration," filed Jun. 19, 2013, all of which claim priority to U.S. Provisional Patent Application No. 61/067,130, filed on Feb. 26, 2008. The contents of all of the above are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises or consists essentially of: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009. The contents of the above are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein $[(Al_2O_3 \text{ (mol \%)}+B_2O_3 \text{ (mol \%)})/(\Sigma \text{ alkali metal modifiers (mol \%)})] > 1$. In some embodiments, the alkali aluminosilicate glass comprises or consists essentially of: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. In some embodiments, the glass comprises or consists essentially of: at least 58 mol % $SiO_2$; at least 8 mol % $Na_2O$; from 5.5 to 12 mol % $B_2O_3$; and $Al_2O_3$, wherein $[(Al_2O_3 \text{ (mol \%)}+B_2O_3 \text{ (mol \%)})/(\Sigma \text{ alkali metal modifiers (mol \%)})] > 1$, $Al_2O_3 \text{ (mol \%)} > B_2O_3 \text{ (mol \%)}$, $0.9 < R_2O/Al_2O_3 < 1.3$. The glass is described in U.S. Pat. No. 8,586,492, entitled "Crack And Scratch Resistant Glass and Enclosures Made Therefrom," filed Aug. 18, 2010, by Kristen L. Barefoot et al., U.S. patent application Ser. No. 14/082,847, entitled "Crack And Scratch Resistant Glass and Enclosures Made Therefrom," filed Nov. 18, 2013, by Kristen L. Barefoot et al., both claiming priority to U.S. Provisional Patent Application No. 61/235,767, filed on Aug. 21, 2009. The contents of all of the above are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5 \text{ (mol \%)}+R_2O \text{ (mol \%)})/M_2O_3 \text{ (mol \%)}] \leq 1.2$, where $M_2O_3 = Al_2O_3 + B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010. The contents of all of the above are incorporated herein by reference in their entirety.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %. In particular embodiments, the glass comprises or consists essentially of: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,298, by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011. The contents of all of the above are incorporated herein by reference in their entirety.

In other embodiments, the alkali aluminosilicate glass is ion exchangeable and comprises: at least about 50 mol % $SiO_2$; at least about 10 mol % $R_2O$, wherein $R_2O$ comprises $Na_2O$; $Al_2O_3$; and $B_2O_3$, wherein $B_2O_3 - (R_2O - Al_2O_3) \geq 3$ mol %. In some embodiments, the glass comprises: at least about 50 mol % $SiO_2$; at least about 10 mol % $R_2O$, wherein $R_2O$ comprises $Na_2O$; $Al_2O_3$, wherein $Al_2O_3$ (mol %) < $R_2O$ (mol %); and 3-4.5 mol % $B_2O_3$, wherein $B_2O_3$ (mol %) - ($R_2O$ (mol %) - $Al_2O_3$ (mol %)) ≥ 3 mol %. In certain embodiments, the glass comprises or consists essentially of: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0 ≤ MgO ≤ 6 and 0 ≤ ZnO ≤ 6 mol %; and, optionally, at least one of CaO, BaO, and SrO, wherein 0 mol % < CaO+SrO+BaO ≤ 2 mol %. When ion exchanged, the glass, in some embodiments, has a Vickers crack initiation threshold of at least about 10 kgf. Such glasses are described in U.S. patent application Ser. No. 14/197,658, filed May 28, 2013, by Matthew J. Dejneka et al., entitled "Zircon Compatible, Ion Exchangeable Glass with High Damage Resistance," which is a continuation of U.S. patent application Ser. No. 13/903,433, filed May 28, 2013, by Matthew J. Dejneka et al., entitled "Zircon Compatible, Ion Exchangeable Glass with High Damage Resistance," both claiming priority to Provisional Patent Application No. 61/653,489, filed May 31, 2012. The contents of these applications are incorporated herein by reference in their entirety.

In some embodiments, the glass comprises: at least about 50 mol % $SiO_2$; at least about 10 mol % $R_2O$, wherein $R_2O$ comprises $Na_2O$; $Al_2O_3$, wherein $-0.5$ mol % $Al_2O_3$ (mol %) - $R_2O$ (mol %) ≤ 2 mol %; and $B_2O_3$, and wherein $B_2O_3$ (mol %) - ($R_2O$ (mol %) - $Al_2O_3$ (mol %)) ≥ 4.5 mol %. In other embodiments, the glass has a zircon breakdown temperature that is equal to the temperature at which the glass has a viscosity of greater than about 40 kPoise and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$ (mol %) - ($R_2O$ (mol %) - $Al_2O_3$ (mol %)) ≥ 4.5 mol %. In still other embodiments, the glass is ion exchanged, has a Vickers crack initiation threshold of at least about 30 kgf, and comprises: at least about 50 mol % $SiO_2$; at least about 10 mol % $R_2O$, wherein $R_2O$ comprises $Na_2O$; $Al_2O_3$, wherein $-0.5$ mol % ≤ $Al_2O_3$ (mol %) - $R_2O$ (mol %) ≤ 2 mol %; and $B_2O_3$, wherein $B_2O_3$ (mol %) - ($R_2O$ (mol %) - $Al_2O_3$ (mol %)) ≥ 4.5 mol %. Such glasses are described in U.S. patent application Ser. No. 903,398, by Matthew J. Dejneka et al., entitled "Ion Exchangeable Glass with High Damage Resistance," filed May 28, 2013, claiming priority from U.S. Provisional Patent Application No. 61/653,485, filed May 31, 2012. The contents of these applications are incorporated by reference herein in their entirety.

In certain embodiments, the alkali aluminosilicate glass comprises at least about 4 mol % $P_2O_5$, wherein ($M_2O_3$ (mol %)/$R_xO$(mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. In some embodiments, the glass is ion exchanged to a depth of layer of at least about 10 μm and comprises at least about 4 mol % $P_2O_5$, wherein $0.6<[M_2O_3$ (mol %)/$R_xO$(mol %)]<1.4; or $1.3<[(P_2O_5+R_2O)/M_2O_3]\leq 2.3$; where $M_2O_3=Al_2O_3+B_2O_3$, $R_xO$ is the sum of monovalent and divalent cation oxides present in the alkali aluminosilicate glass, and $R_2O$ is the sum of divalent cation oxides present in the alkali aluminosilicate glass. The glass is described in U.S. patent application Ser. No. 13/678,013 by Timothy M. Gross, entitled "Ion Exchangeable Glass with High Crack Initiation Threshold," filed Nov. 15, 2012, and U.S. patent application Ser. No. 13/677,805 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of these applications are incorporated herein by reference in their entirety.

In other embodiments, the alkali aluminosilicate glass comprises: from about 50 mol % to about 72 mol % $SiO_2$; from about 12 mol % to about 22 mol % $Al_2O_3$; up to about 15 mol % $B_2O_3$; up to about 1 mol % $P_2O_5$; from about 11 mol % to about 21 mol % $Na_2O$; up to about 5 mol % $K_2O$; up to about 4 mol % MgO; up to about 5 mol % ZnO; and up to about 2 mol % CaO. In some embodiments, the glass comprises: from about 55 mol % to about 62 mol % $SiO_2$; from about 16 mol % to about 20 mol % $Al_2O_3$; from about 4 mol % to about 10 mol % $B_2O_3$; from about 14 mol % to about 18 mol % $Na_2O$; from about 0.2 mol % to about 4 mol % $K_2O$; up to about 0.5 mol % MgO; up to about 0.5 mol % ZnO; and up to about 0.5 mol % CaO, wherein the glass is substantially free of $P_2O_5$. In some embodiments, $Na_2O+K_2O-Al_2O_3\leq 2.0$ mol % and, in certain embodiments, $Na_2O+K_2O-Al_2O_3\leq 0.5$ mol %. In some embodiments, $B_2O_3-(Na_2O+K_2O-Al_2O_3)>4$ mol % and, in certain embodiments, $B_2O_3-(Na_2O+K_2O-Al_2O_3)>1$ mol %. In some embodiments, 24 mol %$\leq RAlO_4\leq 45$ mol %, and, in other embodiments, 28 mol %$\leq RAlO_4\leq 45$ mol %, where R is at least one of Na, K, and Ag. The glass is described in U.S. Provisional Patent Application No. 61/909,049 by Matthew J. Dejneka et al., entitled "Fast Ion Exchangeable Glasses with High Indentation Threshold," filed Nov. 26, 2013, the contents of which are incorporated herein by reference in their entirety.

In some embodiments, the glasses described herein are substantially free of at least one of arsenic, antimony, barium, strontium, bismuth, lithium, and their compounds. In other embodiments, the glasses may include up to about 5 mol % $Li_2O$ and, in some embodiments, up to about 10 mol % $Li_2O$.

In some embodiments, the glasses described herein, when ion exchanged, are resistant to introduction of flaws by sharp or sudden impact. Accordingly, these ion exchanged glasses exhibit Vickers crack initiation threshold of at least about 10 kilogram force (kgf). In certain embodiments, these glasses exhibit a Vickers crack initiation threshold of at least 20 kgf and, in some embodiments, at least about 30 kgf.

The glasses described herein may, in some embodiments, be down-drawable by processes known in the art, such as slot-drawing, fusion drawing, re-drawing, and the like, and have a liquidus viscosity of at least 130 kilopoise. In addition to those compositions listed hereinabove, various other ion exchangeable alkali aluminosilicate glass compositions may be used.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass having a compressive layer extending from a surface of the glass to a depth of compression DOC and under a maximum compressive stress CS of at least 150 MPa, a central region having a maximum physical central tension CT at a center of the glass, the central region extending outward from the center to the depth of compression, and a thickness t in a range from 0.3 mm to 1.0 mm, wherein DOC≥0.08·t and the total elastic energy divided by thickness is less than 200 J/m²·mm and is at least 49.9 J/m²·mm.

2. The glass of claim 1, further comprising tension energy of one of, in units of J/m², 6.4; 7.2; 7.9; 8.1; 8.2; 8.3; 8.7; 8.8; 8.9; 9.4; 9.8; 10.4; or 10.8.

3. The glass of claim 1, further comprising total elastic energy, in units of J/m², of one of: 48.0; 54.8; 56.2; 59.4; 67.3; 67.7; 69.6; 71.9; 73.4; 74.7; 77.1; 78.6; 81.7; or 94.6.

4. The glass of claim 3, further comprising total elastic energy is at least 54.8 J/m².

5. The glass of claim 1, wherein the glass exhibits non-frangible behavior when the surface having the compressive layer is subjected to a point impact force sufficient to create at least one new crack at the surface and to extend the crack through the compressive layer to the central region.

6. The glass of claim 5, wherein $CT_A$ (MPa)≥57 (MPa)−9.0 (MPa/mm)·ln(t) (mm)+49.3 (MPa/mm)·ln²(t) (mm), wherein $CT_A$ is the central tension CT as determined by FSM, wherein $CT_A$=a frangibility limit $CT_3$ when the thickness t is less than or equal to 0.75 mm and wherein $CT_A$≥−38.7 (MPa/mm)×ln(t) (mm)+48.2 (MPa).

7. The glass of claim 1, wherein the thickness is from 0.4 mm to 1.0 mm.

8. The glass of claim 1, wherein the glass is an alkali aluminosilicate glass comprising at least 4 mol % $P_2O_5$ and from 0 mol % to 4 mol % $B_2O_3$, and wherein $1.3<[(P_2O_5+R_2O)/M_2O_3]\leq 2.3$, where $M_2O_3=Al_2O_3+B_2O_3$, and $R_2O$ is the sum of monovalent cation oxides present in the alkali aluminosilicate glass.

9. The glass of claim 1, wherein the glass is an alkali aluminosilicate glass comprising: from 50 mol % to 72 mol % $SiO_2$; from 12 mol % to 22 mol % $Al_2O_3$; up to 15 mol % $B_2O_3$; up to 1 mol % $P_2O_5$; from 11 mol % to 21 mol % $Na_2O$; up to 5 mol % $K_2O$; up to 4 mol % MgO; up to 5 mol % ZnO; and up to 2 mol % CaO, wherein $Na_2O+K_2O-Al_2O_3\leq 2.0$ mol %, $B_2O_3-(Na_2O+K_2O-Al_2O_3)>4$ mol %, and 24 mol %$\leq RAlO_4\leq 45$ mol %, wherein R is at least one of Na, K, and Ag.

10. The glass of claim 9, wherein the alkali aluminosilicate glass further comprises up to 10 mol % $Li_2O$.

11. The glass of claim 1, wherein:
a. the physical central tension CT is greater than $0.681 \times (57 - 9.0 \times \ln(t) + 49.3 \times (\ln(t))^2)$ when $0.3 \text{ mm} \leq t \leq 0.5 \text{ mm}$;
b. the physical central tension CT is greater than $0.728 \times (57 - 9.0 \times \ln(t) + 49.3 \times (\ln(t))^2)$ when $0.5 \text{ mm} \leq t \leq 0.7 \text{ mm}$; and
c. the physical central tension CT is greater than $$0.755 \times \left( -38.7 \left( \frac{\text{MPa}}{\text{mm}} \right) \times \ln(t)(\text{mm}) + 48.2 \text{ (MPa)} \right)$$

when $0.7 \text{ mm} < t \leq 1.0 \text{ mm}$.

12. The glass of claim 1, wherein the total elastic energy divided by thickness is less than 140 $J/m^2 \cdot mm$.

13. The glass of claim 12, wherein the total elastic energy divided by thickness is less than 120 $J/m^2 \cdot mm$.

14. The glass of claim 13, wherein the total elastic energy divided by thickness is between 98 $J/m^2 \cdot mm$ and 116.5 $J/m^2 \cdot mm$.

15. The glass of claim 1, wherein $DOC \geq 0.1 \cdot t$.

16. The glass of claim 15, wherein $DOC \geq 0.12 \cdot t$.

17. The glass of claim 16, wherein $DOC \geq 0.15 \cdot t$.

18. The glass of claim 15, wherein $DOC \leq 0.204 \cdot t$.

19. The glass of claim 16, wherein $DOC \leq 0.204 \cdot t$.

20. The glass of claim 17, wherein $DOC \leq 0.204 \cdot t$.

* * * * *